US00RE35553E

United States Patent [19]

Li

[11] E Patent Number: Re. 35,553

[45] Reissued Date of Patent: Jul. 8, 1997

[54] OPTICAL RF STEREO

[76] Inventor: Ming-Chiang Li, 11415 Bayard Dr., Mitchellville, Md. 20721

[21] Appl. No.: 375,654

[22] Filed: Jan. 20, 1995

Related U.S. Patent Documents

Reissue of:

[64] Patent No.: 5,294,930
Issued: Mar. 15, 1994
Appl. No.: 877,419
Filed: May 1, 1992

[51] Int. Cl.[6] ..... H04K 3/00; G01S 7/38

[52] U.S. Cl. ..... 342/13; 244/3.12; 342/14; 342/54; 342/58; 342/62; 342/60; 342/125; 342/126

[58] Field of Search ..... 342/13, 14, 54, 342/56, 58, 60, 62, 73, 82, 125, 126; 244/3.12; 89/36.15

[56] References Cited

U.S. PATENT DOCUMENTS

| | | | |
|---|---|---|---|
| 3,217,097 | 11/1965 | Pauli et al. | 358/109 |
| 3,715,953 | 2/1973 | Allan | 89/36.14 |
| 4,344,675 | 8/1982 | Yao | 359/285 |
| 4,354,247 | 10/1982 | Yao | 359/305 |
| 4,355,869 | 10/1982 | Yao | 356/5 |
| 4,386,848 | 6/1983 | Clendenin et al. | 356/5 |
| 4,440,468 | 4/1984 | Auracher et al. | 385/14 |
| 4,556,986 | 12/1985 | Craig | 382/42 |
| 4,739,334 | 4/1988 | Soref | 342/368 |
| 4,900,116 | 2/1990 | Mathis | 350/96.15 |
| 4,910,539 | 3/1990 | Mathis et al. | 350/96.15 |
| 4,976,520 | 12/1990 | Brandstetter et al. | 350/384 |
| 5,002,352 | 3/1991 | Bradley et al. | 350/96.12 |
| 5,005,946 | 4/1991 | Brandstetter | 350/162.12 |
| 5,105,380 | 4/1992 | Owechko | 364/825 |
| 5,140,651 | 8/1992 | Soref et al. | 385/2 |
| 5,186,414 | 2/1993 | Holzschuh et al. | 244/3.12 |
| 5,296,860 | 3/1994 | Li | 342/58 |

OTHER PUBLICATIONS

Li, "Impact of Optical fibers on Electronic Warfare", Jan. 10, 1990.

Li, "Threat Hit Assessment", Mar. 1990; Apr. 1991.

Li, "Tethered RF Sensors and Air Defense Suppression", Jun. 4, 1991.

E–Systems Melpar, Tracer Aerospace, "Towed Angle Deception System Flight Demonstration Plan", Oct. 27, 1992.

*Primary Examiner*—John B. Sotomayor

[57] ABSTRACT

An optical RF stereo systems includes multiple remote vehicles, a processing center, and optical RF link systems for transmitting RF signals from remote vehicles to the processing center and for transmitting command and control signals from the processing center to remote vehicles.

20 Claims, 13 Drawing Sheets

100

500

600a

600b

OPTICAL RF STEREO

Matter enclosed in heavy brackets [ ] appears in the original patent but forms no part of this reissue specification; matter printed in italics indicates the additions made by reissue.

TECHNICAL FIELD OF INVENTION

This invention relates to advanced radio frequency (RF) systems which utilize optical fibers or direct lasers to achieve RF transmission and reception of widely separated RF antennas. The functional goals of these systems are to setup RF deceptions for countering RF threats, to carry out live battle field deceptions, to assess the success of deceptions, to locate individual unfriendly RF emitters hidden in dense RF environment for electronic intelligence gathering, as well as other applications.

CROSS-REFERENCE TO RELATED APPLICATIONS

This application is related to application Ser. No. 07/787,085, Group Art Unit: 2202, Filing Date: Nov. 4, 1991.

BACKGROUND OF THE INVENTION

A live musical production consists of many voices, instruments, and sound effect generators. These sound sources constitute a very dense acoustical environment. Stereo is a high fidelity sound reproduction scheme which uses many channels to record a live musical production. The intrinsic characteristics associated with the excitements, locations and movements of these sources are faithfully recorded in a stereo sound reproduction scheme. On a play back mode, the stereo systems will truly reproduce these intrinsic characteristics. An audiophile can enjoy a live musical production in his own living room with the help of his stereo play back system. He is able to identify and locate each of the musical sources without any confusions. Meanwhile he is deceived by his stereo play back system as if a live musical production is performing for him specially.

While stereo systems are dominated ones in acoustics, RF deception systems in use today are mono in nature, i.e. each deception system is comprised of a single antenna to receive and transmit RF radiations. Mono RF deception systems suffer from many drawbacks. They lack the sophistication and spatial diversity as in comparison with acoustical stereo systems. They can not reproduce many important features and RF signatures of fighting platforms for achieving successful deceptions. In light of the above, there is a need in the art for more advanced RF systems for deception, and other applications.

The objectives of the present invention are for electronic deceptions as well as intelligence gathering, and other applications. The invention is based on the RF modulation of laser sources. An optical fiber RF link system was introduced in the previous invention of optical fiber based bistatic radars. The inventor has discovered that RF links can also be accomplished through direct laser transmissions. The difference between optical fiber and direct laser RF link systems is only in the replacement of the optical fiber by a direct laser. Both optical fiber and direct laser RF link systems will be referred to as an optical RF link system. The optical fiber based bistatic radar should be properly referred to as an optical bistatic radar.

RF interferometers as used in radio astronomy employ multiple antennas, which are regularly spaced and properly placed. They function as a whole antenna for attaining the finest angular detail in astronomical observations. Like the placement of speakers in the stereo sound reproduction, no strict regularities are imposed on the placement of antenna subsystems in the present invention. In most cases, these antennas mounted on respective remote vehicles move separately to achieve objectives of the present invention.

SUMMARY OF THE INVENTION

Embodiments of the present invention advantageously satisfy the above identified need in the art and provide advanced RF systems which are sophisticated, and versatile; which achieve RF stereo reception and transmission; which process and generate RF signals at a central location and not at antenna locations. In particular, an embodiment of the inventive RF systems comprises a network of optical RF link systems, a processing center, and a number of antenna subsystems which mounted on remotely situated vehicles. The antenna subsystems transmit and receive RF signals. A network of optical RF link systems links these antenna subsystems with the processing center. Remote vehicles do not need RF receivers and RF generators to process and to generate RF signals.

In a preferred embodiment of the present invention, antenna subsystems on remote vehicles are passive and do not require operation personnel. These antenna subsystems are under direct command and control from the processing center. On receiving modes, received RF signals from these antenna subsystems are fed by the network of optical RF link systems directly to the processing center for processing. On transmitting modes, RF generators at the processing center generate RF signals and send these RF signals through the network of optical link systems to antenna subsystems for transmissions. Further, the remote vehicles do not require the RF receivers and processing capabilities except amplifications and up converting RF signals to optical signals or down converting optical signals to RF signals.

BRIEF DESCRIPTION OF THE DRAWING

A complete understanding of the present invention may be gained by considering the following detailed description in conjunction with the accompanying drawings, in which.

DETAILED DESCRIPTION

Figure 1:
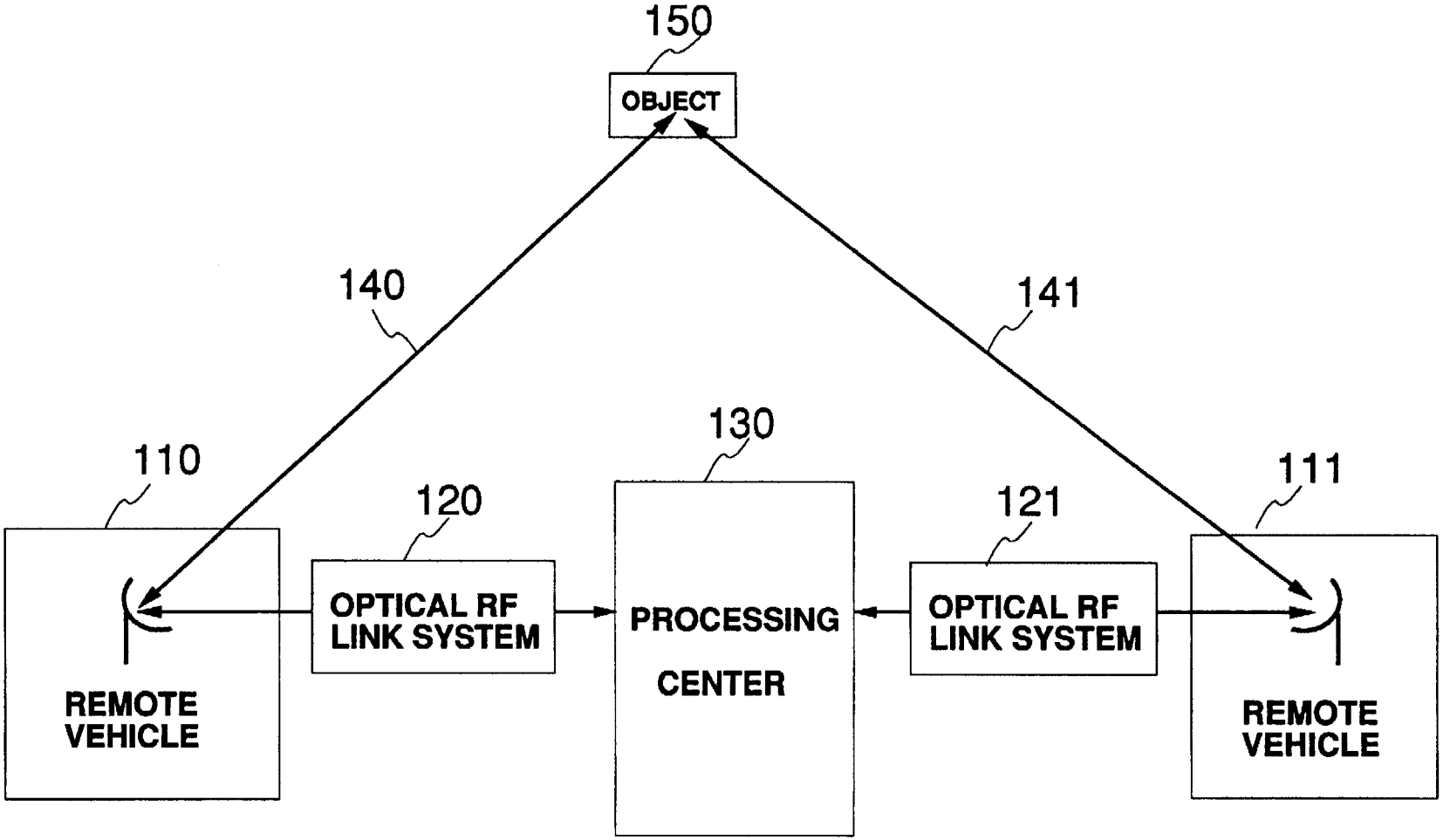
FIG. 1 shows a block diagram of an optical RF stereo systems fabricated in accordance with the present invention.

FIG. 1 shows a block diagram of embodiment 100 of an optical RF stereo systems ("ORSS") fabricated in accordance with the present invention. As shown in FIG. 1, ORSS is comprised of remote vehicles 110 and 111 ("RV 110 and RV 111"), optical RF link systems 120 and 121 ("ORLS 120 and ORLS 121"), processing center 130 ("PC 150"). Although FIG. 1 shows two remote vehicles, embodiments of the present invention include systems wherein ORSS is comprised of a multiplicity of remote vehicles. As those of ordinary skill in the art should readily appreciate that PC 130 may be collocated with one of the remote vehicles.

RV 110 and RV 111 in FIG. 1 are comprised of respective antenna subsystems and RF amplifiers which are well known to those of ordinary skill in the art and is passive, i.e., unmanned, since no on-vehicle supporting personnel is needed. ORSS 100 may be operated in one of three different modes:

First, in a receiving mode, RV 110 and RV 111 receive RF signals 140 and 141 from object 150 which may be an active RF emitter or a body passively reflecting RF radiation. RV 110 and RV 111 do not possess RF receivers. Both RV 110 and RV 111 forward received RF signals 140 and 141 over ORLS 120 and ORLS 121 respectively to RF receivers at PC 130 for processing.

Second, in a transmitting mode, RF signals generated by PC 130 are coherently split and sent respectively through ORLS 120 and ORLS 121 to RV 110 and RV 111. After receiving at RV 110 and RV 111, RF signals will be amplified then are transmitted through respective antenna subsystems at RV 110 and RV 111. The transmitted RF signals 140 and 141 head to the object 150 which may be a radiation seeker as well as a passive RF radiation monitor.

Third, in a receiving-transmitting mode, RF signals from object 150 are received by one of the remote vehicle RV 110. After receiving, RV 110 sends the received RF signals 140 through ORLS 120 to PC 130 for processing. After processing, PC 150 sends the processed RF signals through ORLS 121 to RV 111. At RV 111, the RF signals will be amplified and then are transmitted through the antenna subsystem back to the object 150. If object 150 is a monostatic radar, then PC 130 does not change the carrier frequency of the RF signals in processing. If object 150 is s two-way navigational transponder, then PC 130 in processing will change the carrier frequency of the RF signals accordingly.

Similarly, RF signals from said object 150 are received by the remote vehicle RV 111. After receiving, RV 111 sends the received RF signals 141 through ORLS 121 to PC 130, which processes the RF signals 141 in a same manner as the RF signals 140. After processing, PC 130 sends the processed RF signals through ORLS 120 to RV 110. At RV 110, the RF signals will be amplified and then are transmitted through the antenna subsystem back to the object 150.

Figure 2:
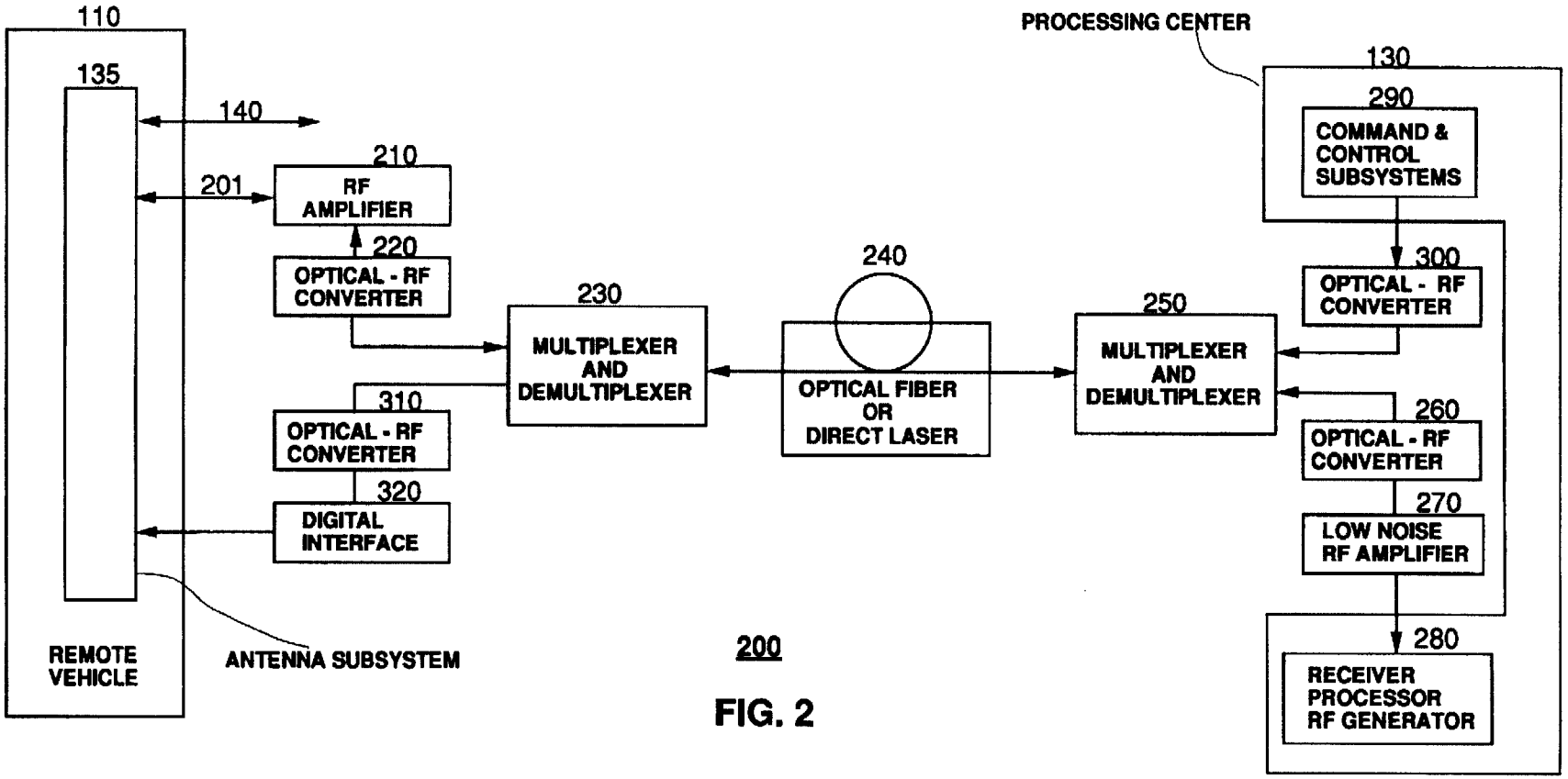
FIG. 2 shows a block diagram of an optical RF link system for use in fabricating embodiments of the present invention.

FIG. 2 shows a block diagram of an optical RF link system for use in fabricating embodiments of the present invention. The optical RF link system is basically the optical fiber RF link system as specified in the previous invention of optical fiber based bistatic radars. As shown in FIG. 2, either the optical fiber or the direct laser is selected as the medium for sending RF signals. The selection depends problems on the hand. The optical RF link system sends RF signals to and back from remote vehicles, both optical-up and down-converters are used. All converters are referred to as optical-RF converters. The optical fiber RF link system as specified in the previous invention of optical fiber based bistatic radars is a special case and only for one-way RF transmissions. The optical RF link system as specified here is more general and for two-way RF transmissions As shown in FIG. 2 of receiving mode operation, RV 110 receives RF signals 140 as input and outputs received RF signals 201. Then, received RF signals 201 are applied as input to low noise RF amplifier 210 to assure enough signal strength in order to overcome optical conversion losses. The output from RF amplifier 210 is applied as input to optical-RF converter 220. Optical-RF converter 220 converts the output from RF amplifier 210 into optical signals. The optical signals from optical-RF converter 220 are applied as input to multiplexer and demultiplexer 230. Multiplexer and demultiplexer 230 applies the optical signals as input to optical fiber or direct laser 240 for transmission to multiplexer and demultiplexer 250 at PC 130. Multiplexer and demultiplexer 250 applies the optical signals as input to optical-RF converter 260. Optical-RF convener 260 converts the optical signals back to RF signals and applies the RF signals as input to low noise RF amplifier 270. RF amplifier 270 amplifies the RF signals and applies them as input to processor and receiver 280 for processing.

As shown in FIG. 2 of transmitting mode of operation, lower noise RF amplifier 270 receives RF signals generated by RF generator 280 as input and amplifies RF signals to a proper strength in order to overcome optical conversion losses. The output from RF amplifier 270 is applied as input to optical-RF converter 260. Optical-RF converter 260 converts the output from RF amplifier 270 into optical signals. The optical signals from optical-RF converter are applied as input to multiplexer and demultiplexer 250. Multiplexer and demultiplexer 250 applies the optical signals as input to optical fiber or direct laser for transmission to multiplexer and demultiplexer 230 at RV 110. Multiplexer and demultiplexer 230 applies the optical signals as input to optical-RF converter 220. Optical-RF converter 220 converts the optical signals to the RF signals and applies the RF signals to low noise RF amplifier 210. RF amplifier 210 amplifies the RF signals and send to a power amplifier at RV 110. The power amplifier send the amplified RF signals to the antenna subsystem at RV 110 for transmission.

As further shown in FIG. 2, command and control signals which are used to slave RV 110 are sent from PC 130 to RV 110 in the following manner. Command and control signals are generated by command and control subsystems 290 and are applied as input to optical-RF converter 300. Then, optical-RF converter 300 converts the command and control signals into optical signals and applies the optical signals as input to multiplexer and demultiplexer 250. Multiplexer and demultiplexer 250 applies the optical signals as input to optical fiber or direct laser 240 for transmission to multiplexer and demultiplexer 230 at RV 110. Multiplexer and demultiplexer 230 applies the optical signals as input to optical-RF converter 310. Optical-RF converter 310 converts the optical signals back to command and control signals and applies the command and control signals as input to digital interface 320. Lastly, digital interface 320 applies command and control signals to the antenna subsystem 135 at RV 110.

Low noise RF amplifier 210, optical-RF converter 220, multiplexer and demultiplexer 230, optical fiber 240, multiplexer and demultiplexer 250, optical-RF converter 260, low noise RF amplifier 270, optical-RF converter 300, optical-RF converter 310, and digital interface 320 are apparatuses which are well known to those of ordinary skill in the art. For example: (a) optical-RF converters typically comprise modulated laser sources and photodetectors and (b) optical multiplexer and demultiplexer may comprise a spliced optical fiber, a hybrid of a grating and a dielectric thin-film filter, a planar wave guide, and so forth. In addition, processor, receiver, and RF generator 280 are apparatuses which are well known to those of ordinary skill in the art.

Command and control subsystems 290 are apparatuses which are well known to those of ordinary skill in the art and the manner in which command and control signals are generated thereby is also well known to those of ordinary skill in the art. Further, as are well known to those of ordinary skill in the art, the command and control signals typically take the form of digital signals. Still further, the manner in which the command and control signals are sent and utilized to control antenna subsystem 135 of RV 110 is well known to those of ordinary skill in the art.

As those of ordinary skill in the art will readily appreciate, embodiments other than the specific configuration shown in FIG. 2 may be fabricated to provide ORLS 200. For example, the various converters may be combined with the multiplexer and demultiplexers by using multi-wavelength light sources and photodiodes; command and control signals may have own independent link system which may or may not be optical fiber or direct laser based. ORLS 200 may consist a number of fiber or direct laser for sending back and forth RF signals. Further, as optical fiber in-line-amplifiers become available, one may be able to eliminate the use of low noise RF amplifiers.

Figure 3:
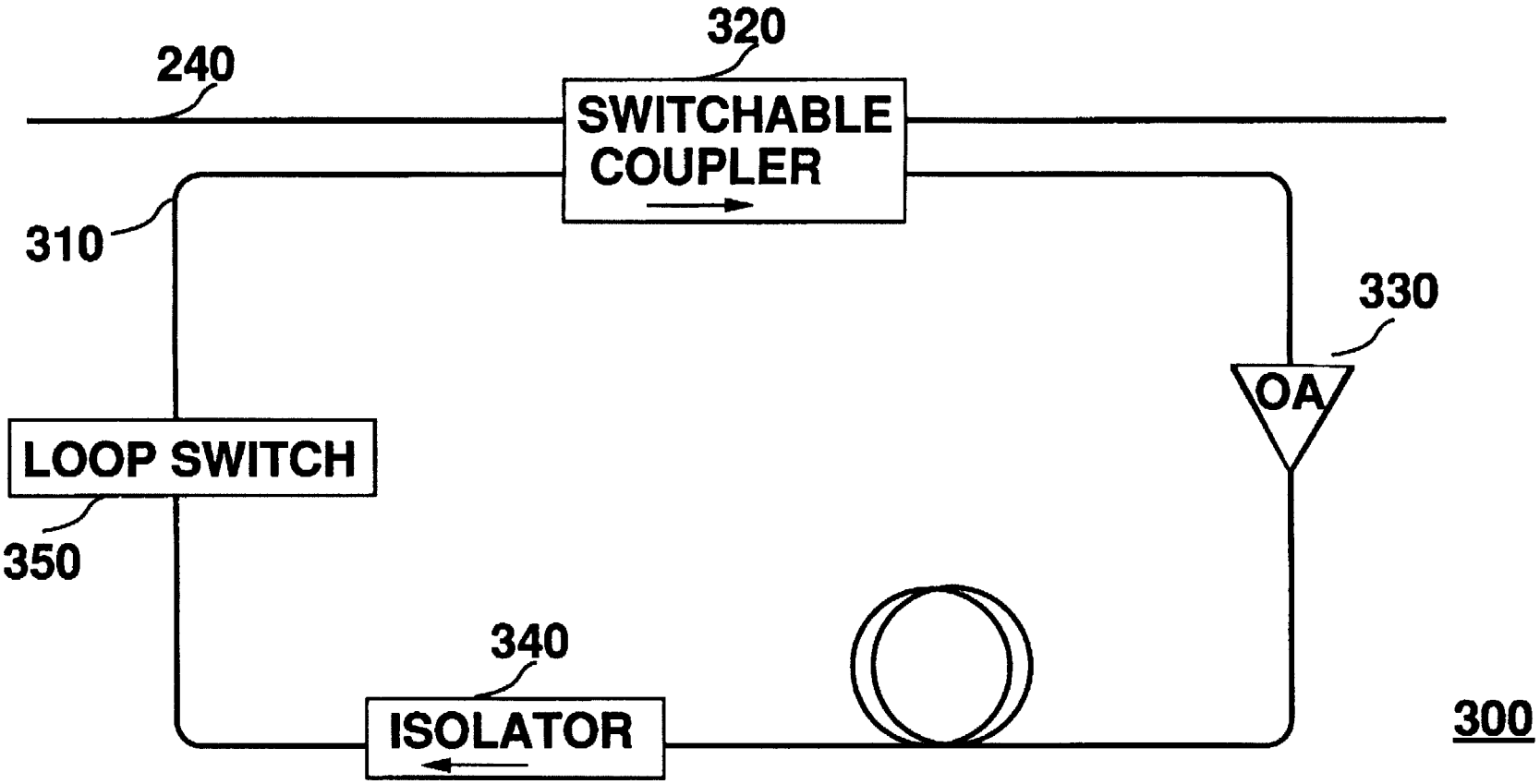
FIG. 3 shows a block diagram of a RF delay loop for use in fabricating embodiments of the present invention which provides proper delays for the processing of RF signals.

FIG. 3 shows a block diagram of a RF delay loop for use in fabricating embodiments of the present invention. The loop provides proper delays for the processing of RF signals. As shown in FIG. 3, partial optical signals in optical fiber 240 are switched into optical fiber loop 310 through switchable coupler 320. The tapped optical signals are amplified through the in-line optical amplifier 330 ("OA 330"). Isolator 340 assures the optical signals in the loop 310 only circulating in one direction. As the optical signals circulate the loop, the signal strength reduces. The reduction is compensated by OA 330 to keep the optical signals circulating in the loop again and again until switchable coupler 320 is open. A partial of RF signals are switched back to optical fiber 240 and the remainders are still in the loop circulating. The loop switch 350 will be closed to stop the circulation of RF signals in the loop, before expecting for new arriving optical signals from optical fiber 240. The switchable coupler 320 can be simply a combination of a switch and coupler. Arrows in FIG. 3 indicate the flow direction of optical signals.

In accordance with the present invention, RF signals received from remote antennas are sent directly to PC 130 for processing. RF receivers in PC 130 will correlate these signals. Widely separated remote antennas can create large differences in time arrivals of these signals. RF receivers only can adjust small time difference. A large portion in differences has to be subtracted first in order for RF receivers to correlated these signals. An optical RF link system with an RF delay loop provides an optimum way for the subtraction. As is well known to those of ordinary skill in the art, the time arrival differences among these signals can be accurately determined from the subtraction and correlation.

In accordance with the present invention, RF signals generated by the generator at PC 130 are sent directly to remote antennas for transmission to the object 150 of interest. The transit times for different antennas from the generator at PC 130 to object 150 may have large differences. As is well to those of ordinary skill in art, making coherent reception for object 150 requires the minimization of these differences. An optical RF link system with an RF delay loop provides an optimum way for minimizing large differences.

Figure 4:
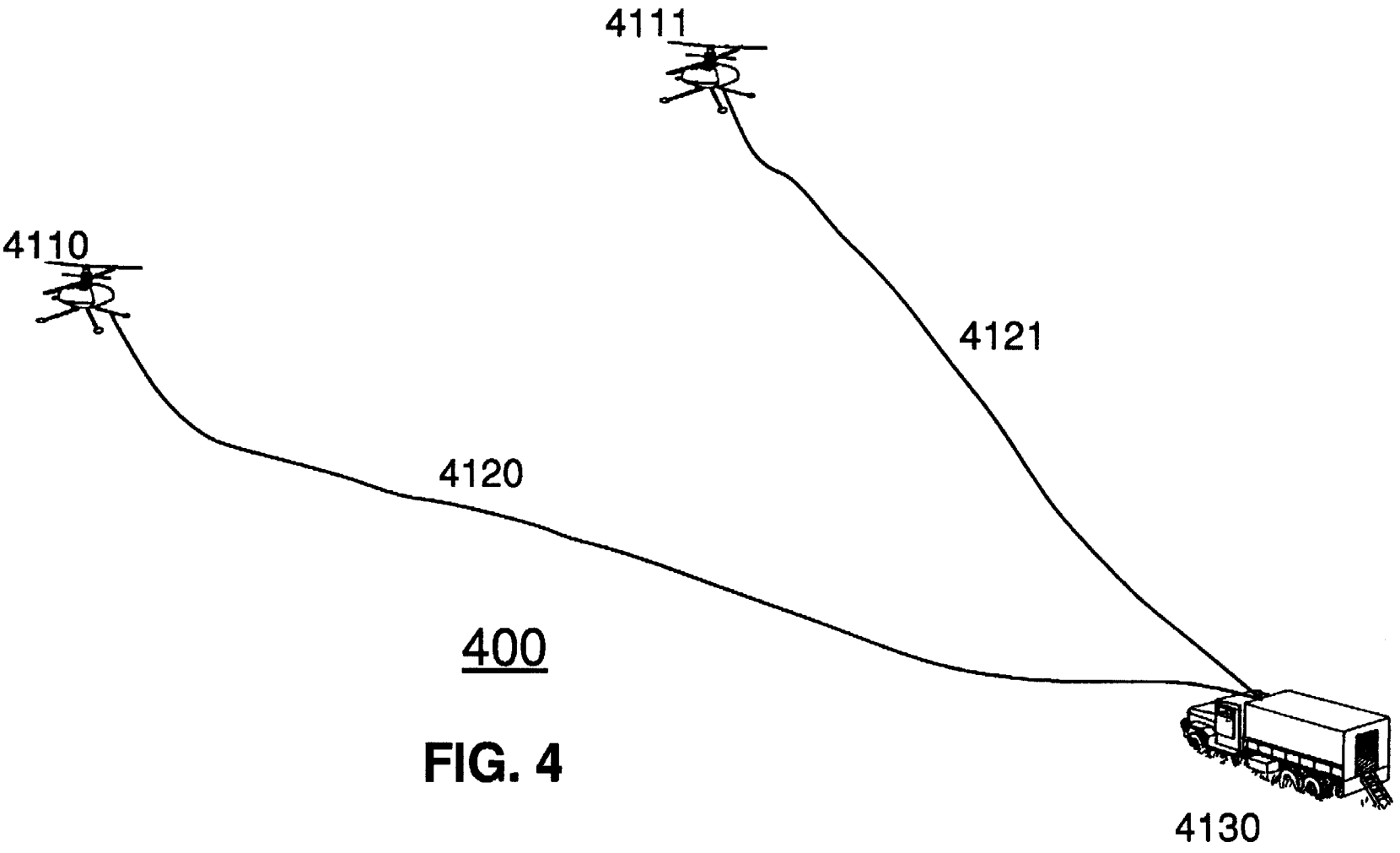
FIG. 4 shows pictorially an application of an optical RF stereo systems with aerial unmanned vehicles, as controlled by a single ground based platform, fabricated in accordance with the present invention.

FIG. 4 shows pictorially an application of an optical RF stereo systems with unmanned aerial vehicles 4110 and 4111 ("UAV 4110 and UAV 4111") as controlled by a single ground based platform, fabricated in accordance with the present invention. The optical RF link systems 4120 or 4121 can either be tethered optical fibers or direct lasers. In a tethered case, an optical RF link system is spooled onto spools at both ends. When such a system is deployed, the spools play out the optical fiber. In a direct laser case, lasers of ORLS 4120 or ORLS 4121 are beamed between an UAV and the ground platform. Laser beams follow respective UAVs as they move. Spatial positions of these UAVs are closely tracked by the ground platform. The method of tracking is well known to those of ordinary skill in the art.

The receiving mode is for electronic intelligence gathering. Prior arts teach radio controlled UAVs. RF signals received by the UAV antenna have to processed by an onboard RF receiver first. The receiver converts RF signals to radio signals, which are sent back to the ground for further processing. These radio controlled UAVs are long range and easy to operate. They have three major deficiencies. First, they are lacking of accuracy in the determination of emitter positions. Since each onboard RF receiver only has the access to the RF signals received from the host UAV, these onboard RF receivers are not able to perform a comparative correlation with RF signals from other UAV. Without the comparative correlation, the distance difference of two UAVs to each emitter can not be properly measured. The location of each emitter is only determined up to the UAV's antenna beam width. Second, they are lacking of frequency diversity. RF receivers are frequency limited. Sophisticated RF receivers are heavy. The lifting capability restricts the use of sophisticated RF receivers onboard an UAV. Third, they are not covert and vulnerable. The radio transmission reveals the operation of a UAV. The radio link can be jammed. In the light of the above, there is a need in the art for more advanced RF systems to achieve high quality intelligence gathering.

In embodiments of the present invention at a receiving mode of operation, antennas on [UVA] *UAV* 4110 and UAV 4111 both point to the area of interest at a command from the processing center 4130 through ORLS 4120 and ORLS 4121 respectively. The received RF signals from both antennas are sent directly to a RF receiver at processing center 4130, which is housed inside the ground based platform, for processing. The RF receiver first determines functional characteristics of emitters. These emitters may be actively radiating or passively reflecting. Using comparative correlation of RF signals from both UAVs, which are well known to those skilled in the art, the RF receiver then accurately determines the distance difference of these two UAVs to each emitter. The receiving mode of operation is best suited for electronic intelligence surveillance in localizing positions of hostile RF emitters. Prior arts teach the use of RF receivers onboard the each individual UAV to process RF signals. As those with ordinary skill in the art would readily appreciate, prior arts are not able to measure the distance difference.

In further embodiments of the present invention, one of the UAVs moves to a new location after above measurements. Preferably, the new orientation of the baseline connecting two UAVs are perpendicular to the orientation before moving. Measurements are repeated. It is well known in the art that, from the information of UAV positions, pointing directions of antennas, and the distance differences from above sequential measurements, one can accurately determine the positions of each respective RF emitters in the region of the interest. As those with ordinary skill in the art would readily appreciate, wider separations of UAVs will lead to better determinations of RF emitter positions.

In further embodiments of the present invention, more than two UAVs are deployed. The deployment of multiple UAVs increases the cost and complexity of operation, but one will be able to monitor the movements of RF emitters constantly.

The transmitting mode is for deception. Prior arts teach independent and self contained electronic decoys. Due to weight and cost limitation, most of them are simple repeaters and others lack of sophistication. Man made objects are extended in nature and have physical dimensions. These itself contained decoys are only able in mimicking simple point objects and can be easily identified by hostile smart seekers. In the light of the above, there is a need in the art for more advanced decoys.

In embodiments of the present invention at a transmitting mode of operation, RF signals are first synthesized by a RF generator in processing center 4130. The synthesized RF signals then are coherently split into two and sent to respective UAV 4110 and UAV 4111 through ORLS 4120 and ORLS 4121. RF amplifiers onboard UAVs amplify received RF signals from processing center 4130, and send the amplified RF signals through UAV antennas toward the threats of interest. The emitted radiations from UAVs are coherent and UAVs play the roles of electronic decoys.

The present teaching lead to the coherent wave emitted from two antennas at UAVs as $$[a_1\,\mathrm{Exp}[ik_1\cdot(x-x_1)]+a_2\,\mathrm{Exp}[ik_2\cdot(x-x_2)]],\ a_1 Exp[i\vec{k}_1\cdot(\vec{x}-\vec{x}_1)]+a_2 Exp[i\vec{k}_2\cdot(\vec{x}-\vec{x}_2)], \quad (1)$$

where $[k_1$ and $k_2]$ $\vec{k}_1$ *and* $\vec{k}_2$ are the wave vectors from UAV positions $[x_1$ and $x_2]$ $\vec{x}_1$ *and* $\vec{x}_2$ to the position $\vec{x}$ of the interest respectively, $a_1$ and $a_2$ are the amplitudes of the waves emitted from UAVs from positions $[x_1$ and $x_2]$ $\vec{x}_1$ *and* $\vec{x}_2$ respectively. It is well known in the art that wave characteristics are independent to whether waves are scalar or vector. For simplicity, a scalar wave has been chosen to express the electromagnetic radiations emitted from UAVs of the present invention. The direction of the above wave is $$[\frac{1}{|a_1|^2+|a_2|^2}\{[|a_1|^2k_1+|a_2|^2k_2]+|a_1a_2|(k_1+k_2)\times \mathrm{Cos}[\vec{k}_1\cdot(\vec{x}-\vec{x}_1)-\vec{k}_2\cdot(\vec{x}-\vec{x}_2)+\delta_1-\delta_2]\}.] \quad (2)$$

$$\frac{l}{|a_1|^2+|a_2|^2}\{[|a_1|^2\vec{k}_1+|a_2|^2\vec{k}_2]+|a_1a_2|(\vec{k}_1+\vec{k}_2)\times Cos[\vec{k}_1\cdot(\vec{x}-\vec{x}_1)-\vec{k}_2\cdot(\vec{x}-\vec{x}_2)+\delta_1-\delta_2]\}, \quad (2)$$

where $|a_1|\exp(i\delta_1)=a_1$ and $|a_2|\exp(i\delta_2)=a_2$, $\delta_1$ and $\delta_2$ are respective phase shifts. Radar trackers or radiation seekers, whether they use sequential lobing, conical scan or monopulse methods, are all seeking the direction of electromagnetic waves. Electromagnetic radiations emitted or reflected from single point objects have well defined directions $\vec{k}$. Trackers or seekers will lock onto these directions and home to these objects. If a tracker or seeker is not in line with the direction of electromagnetic waves, it will enter a mode searching for the direction. The electromagnetic radiations emitted from UAVs of the present invention as shown from the above equation lack of well defined directions. These directions vary with the position $\vec{x}$ of a tracker or seeker. When the tracker or seeker moves as a function of time t $$[X=X(t),]\ \vec{x}=\vec{x}(t), \quad (3)$$

the radiation direction as seen by the tracker or seeker is constantly varying. The variational rate can be expressed as $$[-\frac{|a_1a_2|(k_1+k_2)}{|a_1|^2+|a_2|^2}\times(k_1-k_2)\cdot x(t)\times \mathrm{Sin}[(k_1\cdot(x(t)-x_1)-k_2\cdot(x(t)-x_2)+\delta_1-\delta_2].] \quad (4)$$

$$-\frac{|a_1a_2|(\vec{k}_1+\vec{k}_2)}{|a_1|^2+|a_2|^2}\times(\vec{k}_1-\vec{k}_2)\cdot\dot{\vec{x}}(t)\times Sin[(\vec{k}_1\cdot(\vec{x}(t)-\vec{x}_1)-\vec{k}_2\cdot(\vec{x}(t)-\vec{x}_2)+\delta_1-\delta_2],$$

where $[\vec{x}(t)]$ $\dot{\vec{x}}(t)$ is the velocity of the tracker or seeker. The embodiments of the present invention will constantly put tracker and seeker in searching modes and losing their tracking capabilities. Anyone with ordinary skills in the art will readily appreciate, embodiments of the present invention advantageously provide an generic method to counter all trackers or seekers including monopulse trackers.

In accordance with the present invention, the delays from ORLS 4120 and ORLS 4121 are properly adjusted, such that the electromagnetic radiations emitted from UAVs remain coherent in the region of interest even at pulsed modes of operation. Many known electromagnetic countermeasure techniques: like range gate pulling, pulse on noise, pulse staggering, delayed pulsing, pulse stretching, cooperate blinking, Doppler shift mimicking, etc . . . can be added directly to enhance the operational diversity of the present invention.

In further embodiments of the present invention, more than two UAVs are deployed. As those of ordinary skill in the art will readily appreciate, many RF generators can be simultaneously deployed such that the RF radiations emitted from each of UAVs are completely different for achieving functional and spatial diversities to encounter multiple threats. Advantageously, the electromagnetic countermeasures of the present invention are more sophisticated and less prone to the antiquation induced by technology evolution than offboard countermeasure techniques of prior arts.

Figure 5:
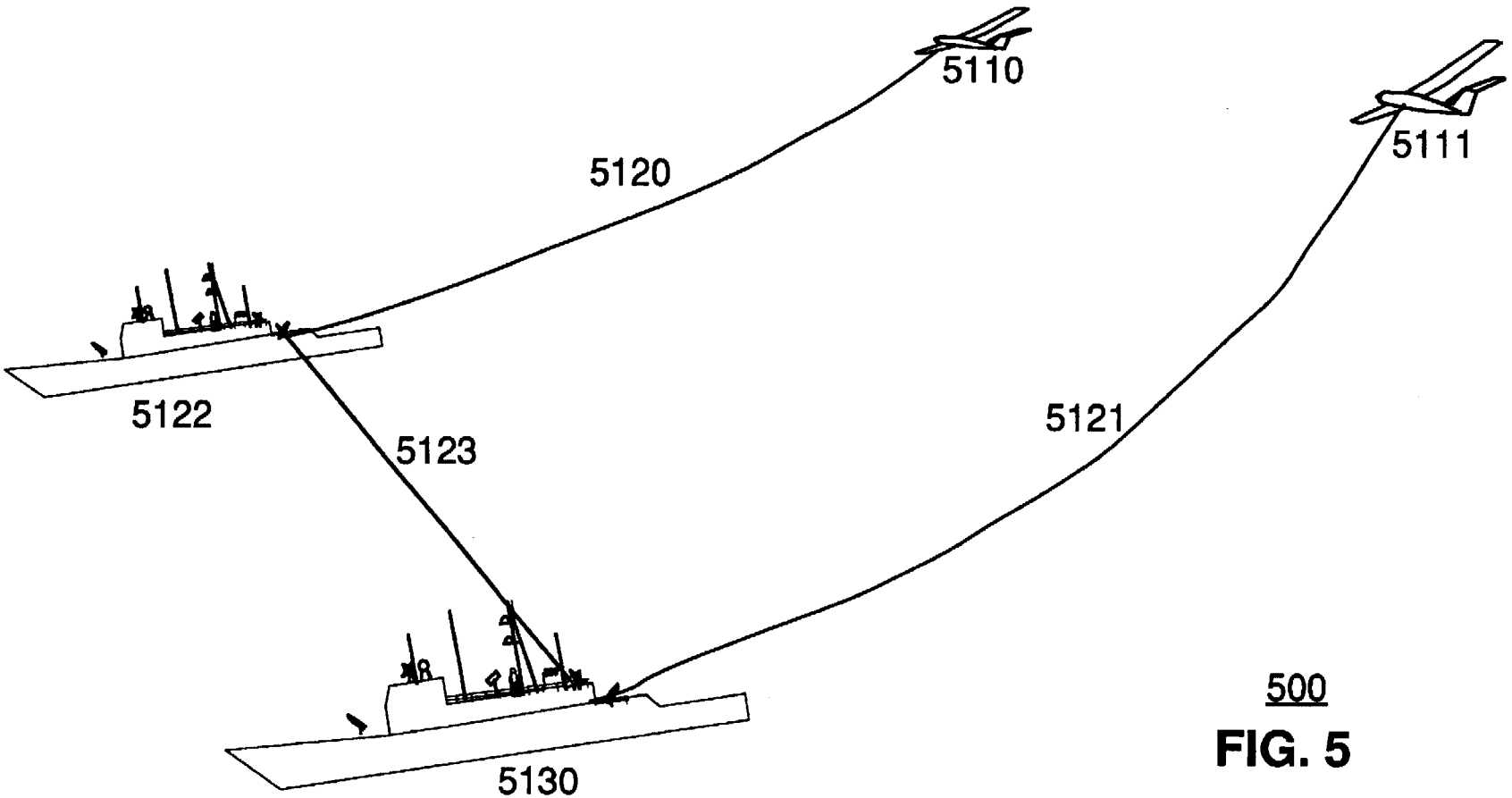
FIG. 5 shows pictorially an application of an optical RF stereo systems with aerial unmanned vehicles, as supported by multiple ground based moving platforms, fabricated in accordance with the present invention.

FIG. 5 pictorially shows an application of an optical RF stereo systems with aerial unmanned vehicles, as supported by multiple ground based moving platforms, fabricated in accordance with the present invention. The ORLS 5120 and ORLS 5121 can either use an optical fiber or a direct laser. One of ground platforms houses the processing center 5130 and the other function as a relay station 5122. In a receiving mode, the relay station 5122 receives RF signals from UAV 5110 through ORLS 5120, then the relay station 5122 forward the received RF signals to processing center 5130 through ORLS 5123. In a transmitting mode, the relay station 5122 receives RF signals from processing center through ORLS 5123, then the relay station 5122 forward the received RF signals to UAV 5110 through ORLS 5120. UAV 5111 is directly linked with processing center 5130 through ORLS 5121. In preferred embodiments, UAV 5110 and UAV 5111 are towed by respective moving platforms, which are linked with each other through a direct laser ORLS 5123.

In further embodiments of the present invention, moving platforms are equipped with respective antenna subsystems and RF amplifiers to function as remote vehicles, which are linked to the processing 5130 center through optical RF link systems. In a receiving mode of operation, moving platforms sail through the area of interest. The multiple remote vehicles constantly and continuously provide information on precise locations and movements of RF emitters under the surveillance. In a transmitting mode of operation, sophisticated deception techniques can be deployed to defeat hostile threats. In accordance with the present invention, these deception techniques are under the direct control of a common processing center. The direct control will remove the degradation created by the conflicts and interferences among deception techniques.

Prior arts teach the use of independent or radio linked multiple vehicles for surveillance and countermeasure deception. Every of these vehicles houses a complete RF systems. In a receiving mode, a complete RF system consists of an antenna subsystem, a RF receiver, a processor, and a radio. In a transmitting mode, a complete RF system consists of an antenna subsystem, a RF amplifier, a RF generator, a processor and a radio. The space and weight limitations of these vehicles require the complete system being specially tailored and packaged. RF receivers and RF generators on these vehicles are functional specific. The functions of these vehicles are limited, scenario dependent, and not generic. Processors on these vehicles are not smart and intelligent due weight and space limitations. Tailoring increases the development costs and lengths the development cycles. Radio links can be easily jammed, and makes the operation noncovert. Furthermore radio links deny the integration with friendly systems in operation. Packaging cans the technology. The packaged RF systems always fall beyond the current technology. As those of ordinary skill in the art will readily appreciate, the present invention teaches RF receivers, RF generators, processors, and command and control systems situated in the processing center. No space and weigh restrictions need be imposed on these apparatuses. Off-the-shelf apparatuses can be used without specially tailoring and packaging. All the deficiencies in the prior arts are eliminated.

Figure 6:
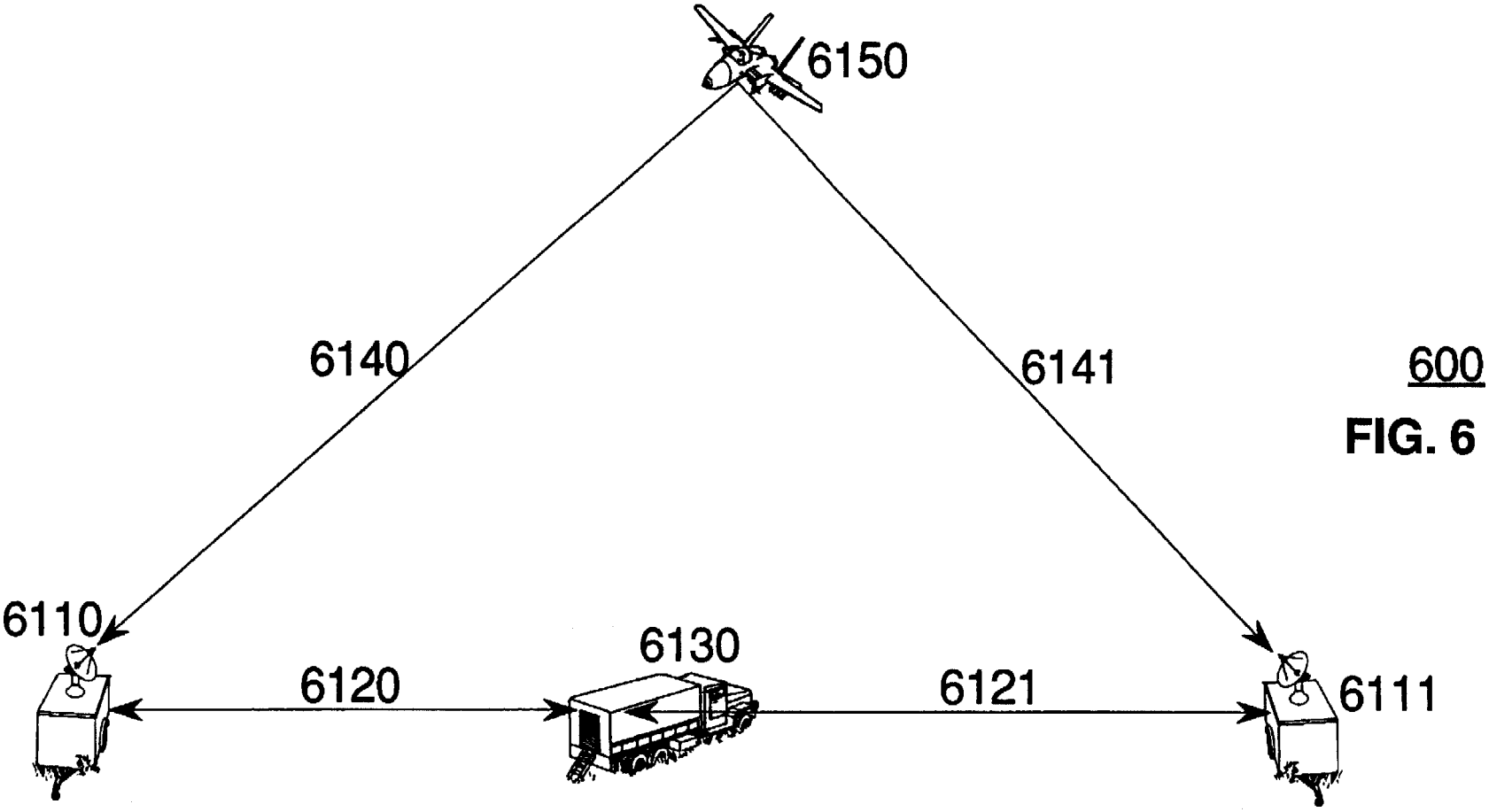
FIG. 6 shows pictorially an application of an optical RF stereo systems with ground based vehicles fabricated in accordance with the present invention.

FIG. 6 pictorially shows an application of an optical RF stereo system with ground based remote vehicles fabricated in accordance with the present invention. Remote vehicles RV 6110 and RV 6111 are linked to and controlled by the processing center 6130 housed inside a ground base platform through ORLS 6120 and ORLS 6121 respectively. As those of ordinary skill in the art will readily appreciate, there are some basic differences in the physics of an unmanned aerial vehicle and a ground based vehicle. An unmanned aerial vehicle has very restricted loading and space limitations, are unstable and autonomous. In a case of failure, an UAV become useless. Comparatively, a ground based vehicle has no loading and space limitations, are stable and easy to maintain. In a case of failure, a man can be sent to fix it.

In further embodiments of the present invention, antenna subsystems on RV 6110 and RV 6111 both point to the hostile threat 6150 at a command from processing center 6130 through ORLS 6120 and ORLS 6121 respectively. The active or passive RF radiations 6140 and 6141 from threat 6150 are received by respective antenna subsystems at RV 6110 and RV 6111. The received RF radiations are sent through ORLS 6120 and ORLS 6121 directly to the processing center 6130 for processing. Mixing of RF radiations from both RVs create a beating, which has the beating frequency of $$[(k_1-k_2)\cdot X(t)] \quad (\vec{k_1}'-\vec{k_2}')\cdot\vec{x}(t), \tag{5}$$

where $[k_1$ and $k_2]$ $\vec{k_1}'$ *and* $\vec{k_2}'$ are the wave vectors from the position of the threat to RV positions, and $[\vec{x}(t)]$ $\vec{x}(t)$ the velocity of the threat. Eq. (5) is the Doppler shift difference of the threat with respect to two RVs. The beating frequency of Eq. (5) measures the threat velocity projection at the direction of the wave vector difference $[k_1-k_2]$ $\vec{k_1}'-\vec{k_2}'$. If RF radiations are pulsed, the delays from ORLS 6120 and ORLS 6120 should be properly adjusted, such that the radiation delay difference between two routes from threat 6150 to the processor at processing center 6130 is minimized, and pulses from two routes will overlap to produce beating.

The Doppler shift difference of Eq. (5) is resulted from intra pulse coherence. It is independent on whether the source of RF radiations is continuous, pulsed, inter pulse coherent, stable, or unstable. A Doppler shift difference $[k_1-k_2)\cdot\vec{X}(t)]$ $(\vec{k_1}'-\vec{k_2}')\cdot\vec{x}(t)$ is usually much smaller than Doppler shifts $[k_1\cdot\vec{X}(t)$ and $k_2\cdot\vec{X}(t)]$ $\vec{k_1}'\cdot\vec{x}(t)$ *and* $\vec{k_2}'\cdot\vec{x}(t)$. Hence, the pulse repetition rate of threat radiations needs not be high, in order to measure a Doppler shift difference. As anyone with ordinary skill in the art will readily appreciate, the RVs should be stable and should not have random motions. Otherwise Doppler shift difference of Eq. (5) will be contaminated and the accuracy in determining the threat velocity projection will decrease.

In further embodiments of the present invention, more than two RVs are deployed. As those of ordinary skill in the art will readily appreciate, the deployment of multiple RVs will determine the instantaneous position and velocity of a hostile or friendly object. In still further embodiments of the present invention, RVs are replaced by antenna subsystems which are installed at various part of a platform. The replacement is within the frame work of the present teaching. Advantageously, the knowledge on the instantaneous position and velocity can be utilized for a real time assessment of electronic countermeasure effectiveness, for accurately locating the launching site of a hostile projectile, for tracking and neutralizing of hostile aircraft or missiles, for intruder detection, for highway traffic safety and control, for air traffic control and landing safety. The real time assessment method based on the Doppler shift difference is much reliable than an incoherent amplitude comparison method.

The latter can be easily contaminated by the fluctuations of hostile radiations. The Doppler shift difference method is a coherent method and the effects of fluctuations can be removed through limiters.

Figure 6A:
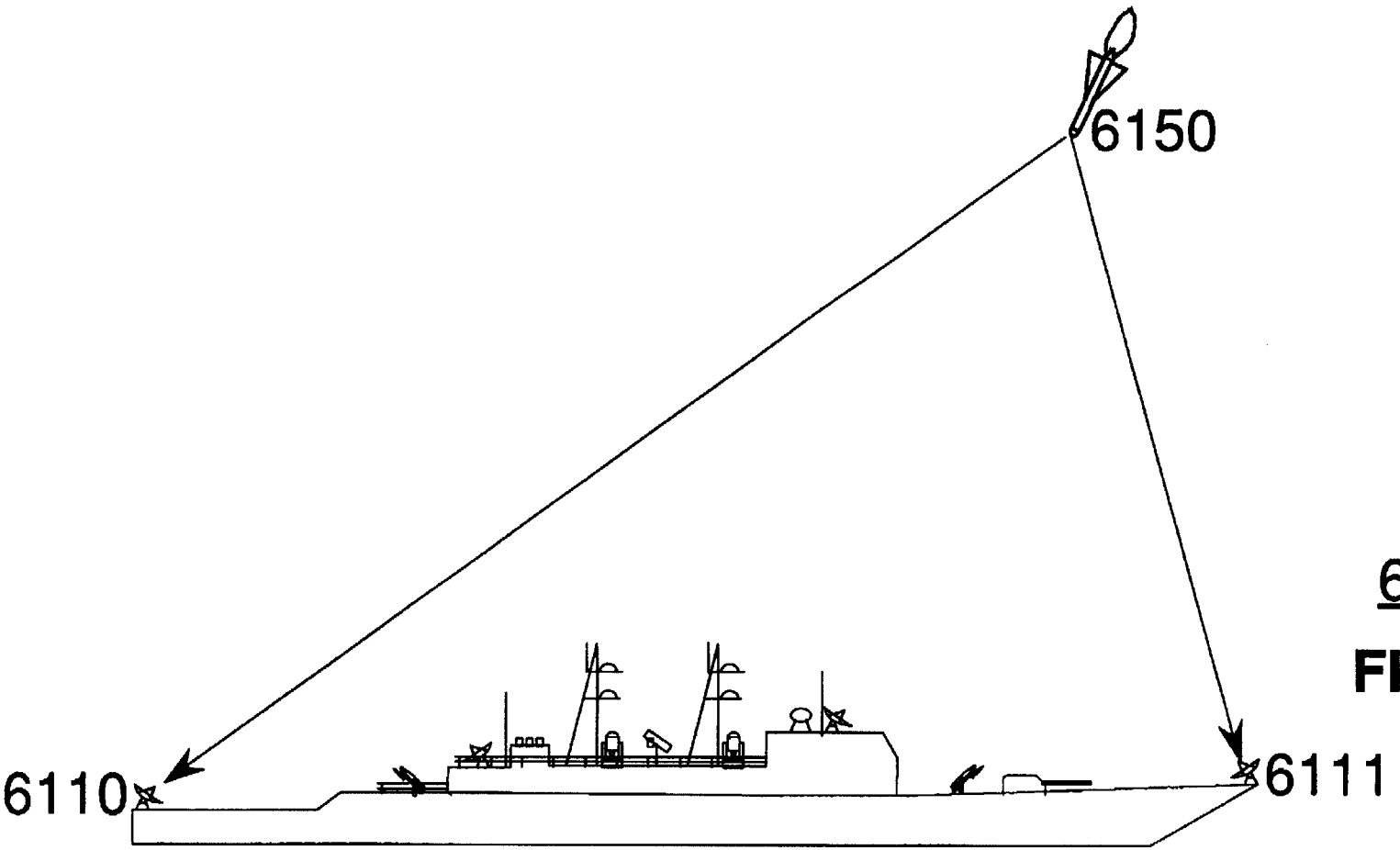
FIG. 6a show pictorially an application of an optical RF stereo systems on a ship for real time threat assessment fabricated in accordance with the present invention.

FIG. 6a show pictorially an application of an optical RF stereo systems on a ship for real time threat assessment fabricated in accordance with the present invention. Antenna subsystems 6110 and 6111 are installed on the bow and stern of a battle ship. Optical RF link systems connect these antenna subsystems with the processing center inside the ship. The measured Doppler shift difference of RF radiations from hostile threat 6150 will indicate whether the threat will hit the ship or not. As anyone with ordinary skill in the art will readily appreciate, if the measured Doppler shift difference is zero, the threat in FIG. 6a will definitely hit the ship. The antenna separation in the case of FIG. 6a is not large. The optical RF link systems may be replaced with coaxial RF link systems.

Figure 6B:
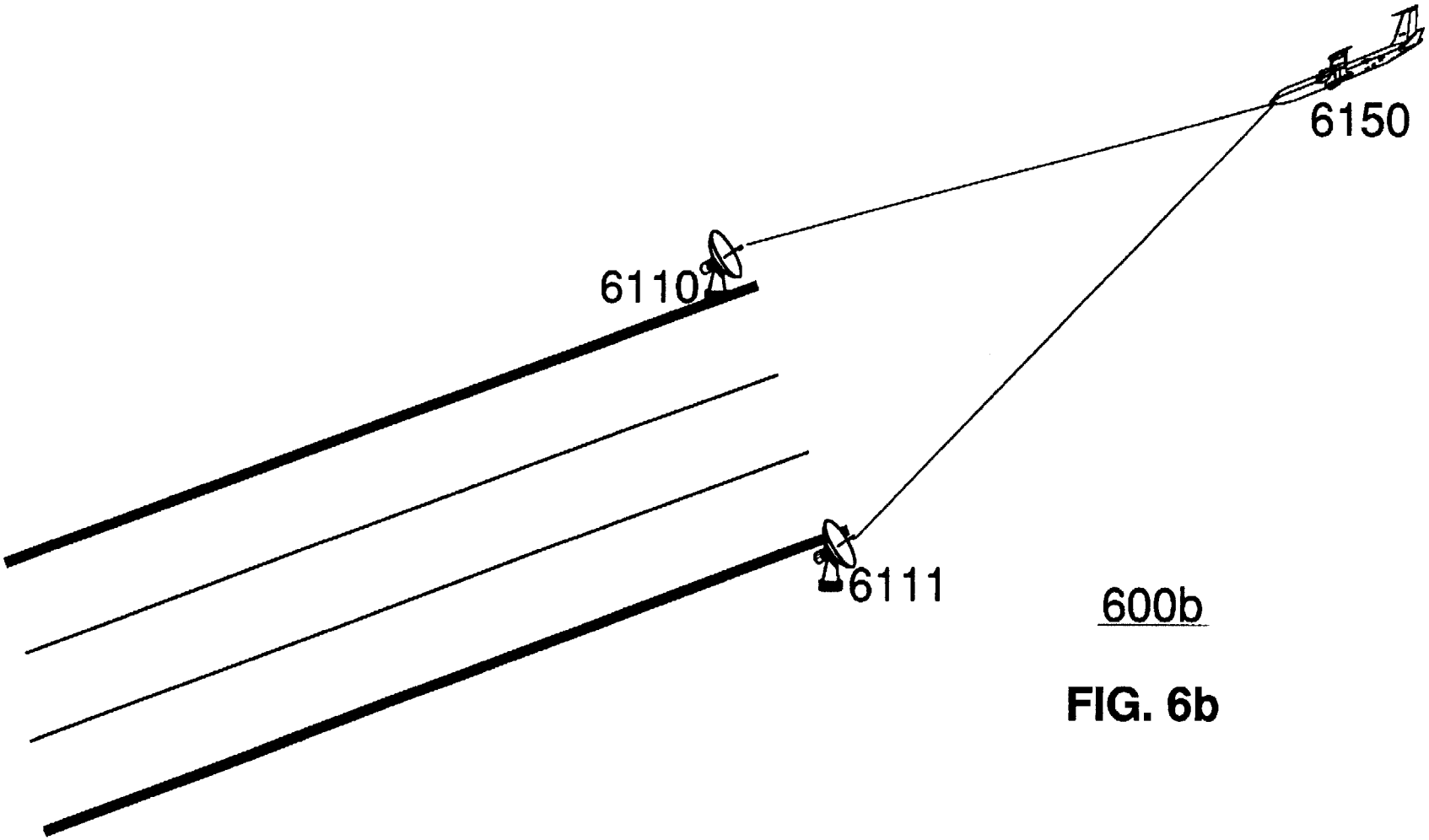
FIG. 6b shows pictorially an application of an optical RF stereo systems for landing safety assessment fabricated in accordance with the present invention.

FIG. 6b shows pictorially an application of an optical RF stereo systems for landing safety assessment fabricated in accordance with the present invention. Antenna subsystems 6110 and 6111 are installed on both sides of a runway. Optical RF link systems connect these antenna subsystems with a receiver at the air traffic control center. If the measured Doppler shift difference of RF radiations from the landing aircraft is zero, the air traffic control center is sure that the aircraft has been aligned with the runway regardless the landing system on the aircraft working or not. As anyone with ordinary skill in the art will readily appreciate, additional antenna subsystems have to be installed in order to provide both horizontal and azimuth alignments.

In accordance with the present invention at a transmitting mode of operation, antenna subsystems on RV 6110 and RV 6111 both point to the hostile threat 6150 at a command from processing center 6130 through ORLS 6120 and ORLS 6121 respectively. RF signals are first synthesized by a RF generator in the processing center 6130. The synthesized RF signals then are coherently split into two and sent to respective RV 6110 and RV 6111 through ORLS 6120 and ORLS 6121. RF amplifiers onboard RVs amplify received RF signals from processing center 6130, and send the amplified RF signals through RV antennas toward threat 6150. The direction of RF signals as perceived by threat 6150 is given at Eq. (2).

Unstable vehicles make positions [$x_1$ and $x_2$] $\vec{x}_1$ *and* $\vec{x}_2$, shifts $\delta_1$ and $\delta_2$ uncertain. The uncertainty leads to statistical variations and reduces the degree of coherence. The radiation direction indicated by Eq. (2) becomes probabilistic, which can be expressed as $$[P_1 \cdot k_1 + P_2 \cdot k_2,]\ P_1 \cdot \vec{k}_1 + P_2 \cdot \vec{k}_2, \tag{6}$$

where $P_1$ and $P_2$ are the probabilities with $P_1+P_2=1$. The problem of this kind is often appeared as a missile seeker illuminated by two independent radiation sources. As anyone with ordinary skill in the art will readily appreciate, two views are existed in interpreting Eq. (6). One of them views that the hostile threat select the direction as indicated by Eq. (6). The other views differently that the hostile threat will either select direction [$k_1$ with probability $P_1$ or direction $k_2$] $\vec{k}_1$ *with probability* $P_1$ *or direction* $\vec{k}_2$ *with probability* $P_2$. The reduction in coherence leads to indetermination of the radiation direction.

For stable vehicles, the uncertainty associated with positions [$x_1$ and $x_2$] $\vec{x}_1$ *and* $\vec{x}_2$ does not occur. Phase shifts $\delta_1$ and $\delta_2$ are well defined. The radiation direction as indicated by Eq. (2) is deterministic. Although it will force a hostile threat into a searching mode, but it still lacks the capability in pulling the hostile threat to a particular direction.

In accordance with the present invention at a receiving-transmitting mode of operation, the active or passive RF radiations from the threat 6150 are received by the antennas on RV 6110. The received RF radiations from antenna subsystem at RV 6110 are sent through ORLS 6120 to processing center 6130. Without any processing, the processing center 6130 sends the received RF radiations through ORLS 6121 to RV 6111. An RF power amplifier at RV 6111 will amplify the RF radiations, which then will be transmitted through the antenna subsystem at RV 6111 back to threat 6150. Similarly the active or passive RF radiations from threat 6150 are received by the antenna subsystem at RV 6111 and the received RF radiations retrace back the same route to the antenna subsystem at RV 6110 for transmitting to threat 6150. The cross transmissions eliminate the phase dependence in Eq. (2), and the direction of RF radiations as seen by threat 6150 can be expressed as $$\left[\frac{1}{|a_1|^2+|a_2|^2}\ [|a_1|^2 k_1 + |a_2|^2 k_2 + |a_1 a_2|(k_1+k_2)].\right] \tag{7}$$

$$\frac{1}{|a_1|^2+|a_2|^2}\ [|a_1|^2 \vec{k}_1 + |a_2|^2 \vec{k}_2 + |a_1 a_2|(\vec{k}_1+\vec{k}_2)]. \tag{7}$$

The radiation direction as experiences by hostile threat no longer depends on the threat position. By adjusting the magnitudes $|a_1|$ and $|a_2|$, one is able to pull threat 6150 to a particular direction. If the Doppler shift difference receiving mode is also adopted, then the success of the directional pulling can be assessed in real time. As anyone with ordinary skill in the art will readily appreciate, present embodiments teach a remote antenna subsystem to pull off a threat.

If during the cross over the phase of one radiation is shift by 180°, the direction of RF radiations as seen threat 6150 is given by $$\left[\frac{1}{|a_1|^2+|a_2|^2}\ [|a_1|^2 k_1 + |a_2|^2 k_2 - |a_1 a_2|(k_1+k_2)].\right] \tag{8}$$

$$\frac{1}{|a_1|^2+|a_2|^2}\ [|a_1|^2 \vec{k}_1 + |a_2|^2 \vec{k}_2 - |a_1 a_2|(\vec{k}_1+\vec{k}_2)]. \tag{8}$$

As anyone with ordinary skill in the art will readily appreciate, to shift broad band RF radiations by a phase 180 ° may not be easy in using conventional RF means, but it is relatively simple by fiber optical means. At $|a_1|=|a_2|$, the radiation direction of Eq. (8) is not defined. Such a method is usually referred to the crosseye. In crosseye applications, two antenna subsystems are aboard on a same platform and are connected by wave guides or coaxial cables. The null state of radiation directions in crosseye applications is quasi stable. An imperfection of the phase reverse or magnitude equality will turn the platform into a radiating beacon.

In further embodiment of the present invention, the receiving-transmitting mode of operation is use to mark air traffic route as similar to highway lane markings for enhancement of air traffic safety. Antenna subsystem pairs with simple repeaters are installed along the air traffic route projection on the ground. When an aircraft flies into the operation range of particular antenna subsystem pair, the aircraft will transmit RF radiations to the pair, which will repeat the received RF radiations back to the aircraft. The beating frequency, which is the Doppler shift difference, of relayed back RF radiations will indicated the aircraft on the course or not. If no Doppler shift difference is detected, the aircraft transmits RF pulse codes with messages to the antenna pair. After the receiving, the antenna subsystem pair will sent RF pulse codes through its optical RF link system to the air traffic control center. If the air craft is not on the course, the messages will be modulated with a beating of Doppler shift difference. The air traffic control will not only get the message, but also can assess whether the aircraft is on the course or not.

In further embodiment of the present invention, the receiving-transmitting mode of operation is used to enhance the aircraft landing safety. Antenna subsystems 6110 and 6111 of FIG. 6b coherently transmit and receive RF signals between the air traffic center and landing aircraft. If the landing aircraft is aligned with the runway, no beatings of Doppler shift difference will be observed. A sudden change in Doppler shift difference will indicate air turbulence effects on landing. The air traffic control and the landing aircraft use the antenna subsystems 6110 and 6111 to communicate and to determine the distance between the aircraft to the run way. A deterioration in communication as indicated by the presence in beating of Doppler shift difference will indicate problems in landing. In accordance with the present invention, the pulling algorithm as indicated by Eq. (7) teaches a method in guarding aircraft to runway and to land aircraft with instruments. As anyone with ordinary skill in the art will readily appreciate, present embodiments will consolidate several air navigation, landing, and control systems to a simplified integrated system with added air traffic safely.

Figure 7:
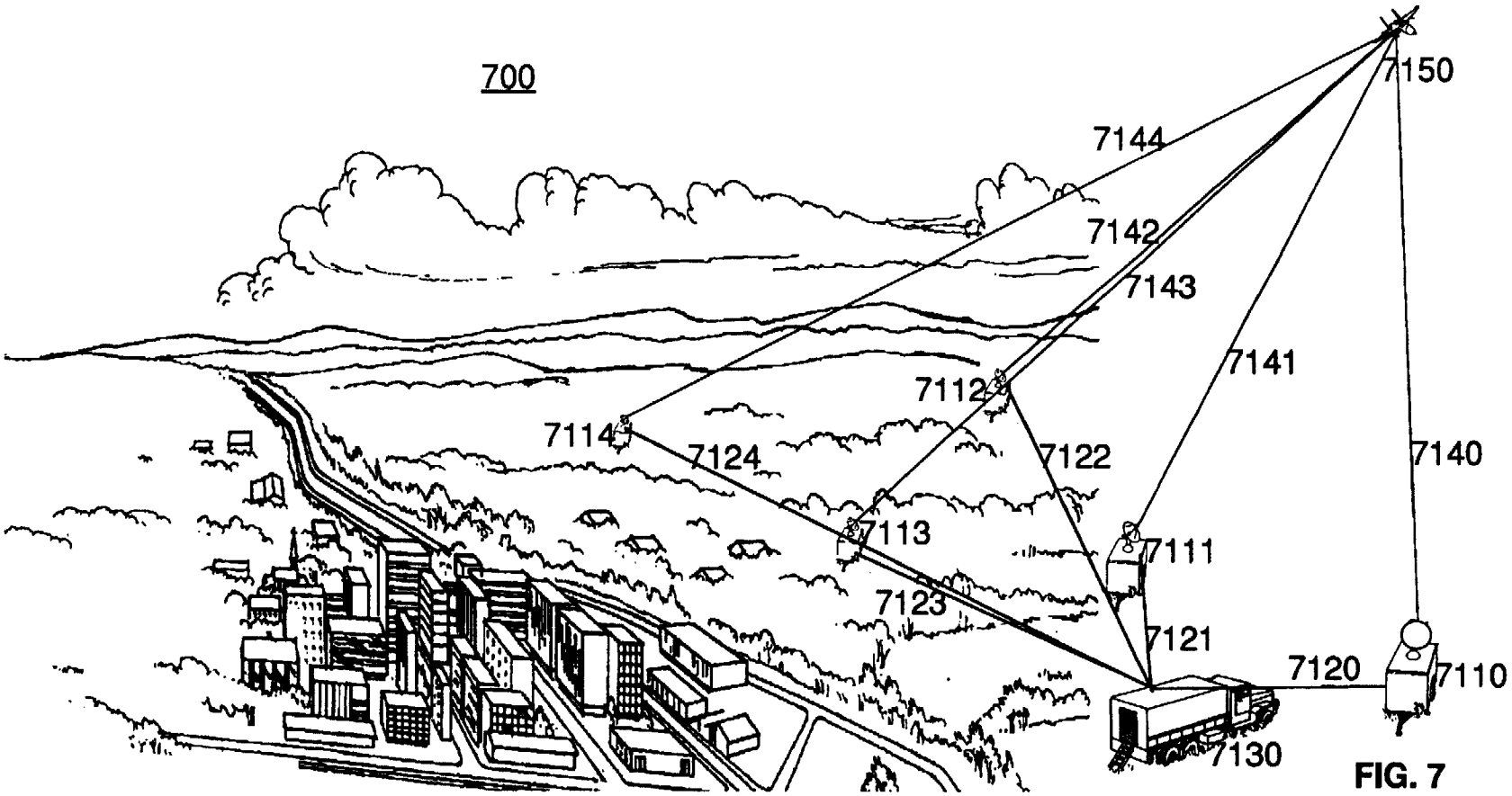
FIG. 7 shows the application of an optical RF stereo systems in gathering and emitting RF signatures fabricated in accordance with the present invention for synthetic imaging countermeasures.

FIG. 7 shows the application of an optical RF stereo systems in gathering and emitting RF signatures fabricated in accordance with the present invention for synthetic imaging countermeasures. The purpose of the application is to deny hostile radars in taking RF images of sensitive areas. Multiple remote vehicles RV 7110, RV 7111, RV 7112, RV 7113, and RV 7114 are linked to and controlled by the processing center 7130 housed inside the ground based platform through ORLS 7120, ORLS 7121, ORLS 7122, ORLS 7123, and ORLS 7124 respectively. In accordance with the present invention at a receiving-transmitting mode of operation, antenna subsystems on RVs point to the imaging airborne craft 7150 at a command from processing center 7130 through rough ORLS 7120, ORLS 7121, ORLS 7122, ORLS 7123, and ORLS 7124 respectively. The RF radiations 7140, 7141, 7142, 7143, and 7144 are received by respective antenna subsystems on RVs 7110, 7111, 7112, 7113, and 7114. The received RF radiations are sent through ORLS 7120, ORLS 7121, ORLS 7122, ORLS 7123, and ORLS 7124 to the processing center 7130 for processing. By the use of harmonic mixing, proper delay looping, and coherently adding, which are known to those skilled in the art, the processed RF radiations are sent through ORLS 7120, ORLS 7121, ORLS 7122, ORLS 7123, and ORLS 7124 to the respective RF amplifiers at RV 7110, RV 7111, RV 7112, RV 7113, and RV 7114 for amplification. The amplified RF radiations then are fed to respective antenna subsystems at RV 7110, RV 7111, RV 7112, RV 7113, and RV 7114 for transmissions back to the imaging airborne craft 7150. The amplitude of RF radiations as received by the imaging airborne craft 7150 has the form $$[\sum_{m=0}^{4} a(m)Exp(+ik\cdot x_m)\sum_{m'}\sum_{n_0,n_1,n_2,n_3,n_4=0}^{4} b(m, m'; n_0,n_1,n_2,n_3,n_4)\cdot Exp\{ik\cdot(n_0x_0+n_1x_1+n_2x_2+n_3x_3+n_4x_4)+ikL(m, m'; n_0,n_1,n_2,n_3,n_4)\}.] \quad (9)$$

-continued $$\sum_{m=0}^{4} a(m)Exp(+\vec{ik}\cdot\vec{x_m})\sum_{m'}\sum_{n_0,n_1,n_2,n_3,n_4=0}^{4} b(m, m'; n_0,n_1,n_2,n_3,n_4)\cdot Exp\{i\vec{k}\cdot(n_0\vec{x_0}+n_1\vec{x_1}+n_2\vec{x_2}+n_3\vec{x_3}+n_4\vec{x_4})+ikL(m, m'; n_0,n_1,n_2,n_3,n_4)\}, \quad (9)$$

where $n_0$, $n_1$, $n_2$, $n_3$, and $n_4$ are zero, positive, and negative integers with $$n_0+n_1+n_2+n_3+n_4=1. \quad (10)$$

[$x_0$, $x_1$, $x_2$, $x_3$, and $x_4$] $\vec{x_0}$, $\vec{x_1}$, $\vec{x_2}$, $\vec{x_3}$, *and* $\vec{x_4}$ are the respective positions of antenna subsystems at RV 7110, RV 7111, RV 7112, RV 7113, and RV 7114. $\vec{k}$ is the wave vector of the RF radiations from imaging airborne craft with $\vec{k}\cdot\vec{k}=k^2$. The quantity a(m) is related to the antenna gain and amplification of the power amplifier at a remote site with index m. b(m, m'; $n_0$, $n_1$, $n_2$, $n_3$, $n_4$) and L(m, m'; $n_0$, $n_1$, $n_2$, $n_3$, $n_4$) are the amplitude and delay path of a processed radiation with an index m'. As anyone with ordinary skills in the art will readily appreciate, harmonic mixing and delay looping are to enhance the countermeasure diversities against cross and down range imaging. Without harmonic mixing and delay looping, many more remote vehicles are needed in order to achieve a same degree of sophistication.

In further embodiments of the present invention, some of remote vehicles are not parked at fixed locations, but are rather driving in a designated area to mimic real inverse synthetic images. As those of ordinary skill in the art will readily appreciate, the number of deployed remote vehicles depends on the size of sensitive areas.

Figure 8:
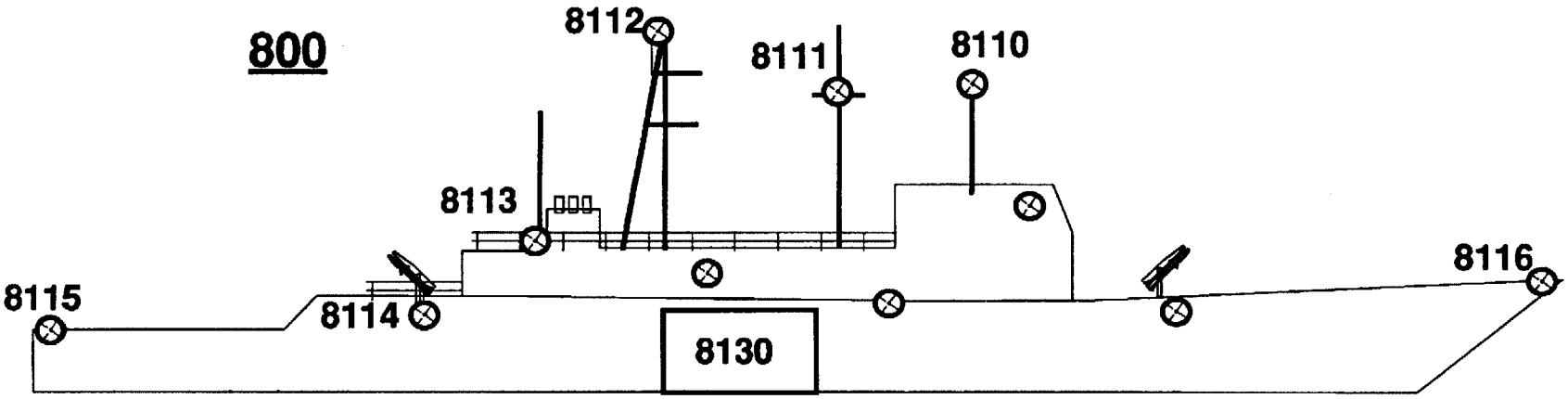
FIG. 8 pictorially shows a part of an optical RF stereo systems fabricated in accordance with the present invention for smart deceptions.

FIG. 8 pictorially shows a part of an optical RF stereo systems fabricated in accordance with the present invention for smart deceptions. The purpose of the deception is to seduce the threat by mimicking real RF signatures, which the threat seeks. Multiple antennas 8110, 8111, 8112, . . . are installed at various part of a ship or aircraft. These antennas are linked to the processing center 8130 inside the ship through their respective optical RF link systems. Antennas 8110, 8111, 8112, . . . will collected RF radiations of a threat then sent through respective optical RF link systems to processing center 8130 for processing. The collected and processed RF radiations will replicate the true RF signatures of a ship in down range, cross range, and Doppler profiles. Furthermore the replication captures transient characteristics of sea state effects on the ship. As those of ordinary skill in the art will now readily appreciate, the processing follows the steps of harmonic mixing, proper delay looping, and coherently adding.

Figure 8A:
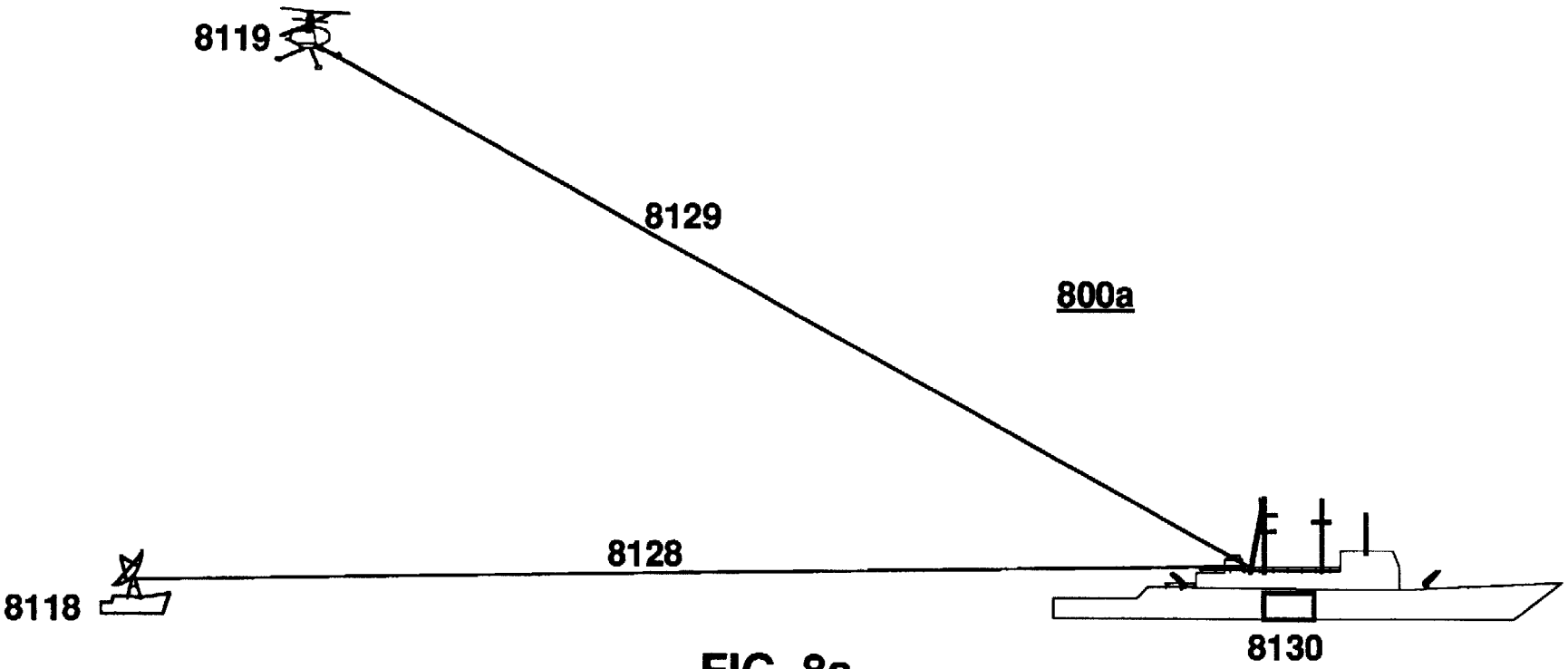
FIG. 8a shows the remaining part of the optical RF stereo systems in FIG. 8 fabricated in accordance with the present invention for smart deceptions.

FIG. 8a shows the remaining part of the optical RF stereo systems in FIG. 8 fabricated in accordance with the present invention for smart deceptions. In accordance with the present invention, the processed RF radiations will be sent from the processing center 8130 to remote crafts 8118, 8119, . . . through respective optical RF link systems. RF amplifiers at remote crafts 8118, 8119, . . . will amplify the received RF radiations, than fed them to the respective antenna subsystems for transmission back to the threat.

The processing causes the time delay in returning RF radiations back to the threat. If the threat operates in a single frequency mode with a fixed pulse repetition rate, then in accordance with methods which are well known to those of ordinary skill in art, the time delay problem can be easily over come. Against a frequency hopping, pulse repetition varying, and leading edge threat, the embodiments of the present invention teach added signal processing at remote crafts 8118, 8119, . . . In a preferred embodiment of the present invention in overcoming the time delay, after collecting the impinged radiations from the hostile seeker, an advanced processor at the processing center 8130 will further generate a set of RF radiations by shifting the carrier frequency of collected radiations. Frequencies of these generated RF radiations should contain those frequencies that the seeker hops. The generated RF radiations will have the same spatial profiles and transient traits as that originally collected. The generated RF radiations are continuously broadcasted through the optical RF link systems to the remoter crafts 8118, 8119, . . . . After receiving the impinged radiations from the hostile seeker at each remote craft, the added processor at the remote craft makes a selection from these broadcasting RF waves and transmits one with the same carrier frequency as that of hostile radiations received at the moment. The transmitted radiations not only have the true RF characteristics of a ship in spatial profiles and transient traits, but are also advanced in timing. After the transmission the remote craft returns to a sleeping state and waits for the next impinging hostile radiations. The central processor sends command and control signals to remote crafts to control their transmission durations, sleeping intervals, expected frequencies of hostile threats, and other functions when the need arises.

In another preferred embodiment of the present invention in overcoming the time delay, antennas 8110, 8111, 8112, . . . collect impinged radiations from the hostile seeker. A processor at the processing center 8130 converts the received hostile radiations to base band and broadcasts them to remote crafts 8118, 8119, . . . At the commands of processing center 8130, remote crafts 8118, 8119, . . . will receive the threat radiations, store in their respective optical delay loops, retransmit the stored radiations by serrodyne modulation of a traveling wave tube with base band RF radiations. As anyone with ordinary skill in art will know that other methods are possible in overcoming time delay problems.

The transient traits of a ship or aircraft are resulted from the vibrations of the engine and propeller, or from natural disturbances. As the RF radiations from a hostile platform impinge on a ship or aircraft, the radiations will undergo a modulation of these vibrations and disturbances. Sequentially reflected radiations are coded with these transient traits. Radar pulses are usually much longer than aircraft, which makes aircraft having less structures in their down range profiles. However, aircraft are highly maneuverable especially with roll, pitch and yaw motions, which makes aircraft rich in transient traits and Doppler range profiles. Ships, which are much larger than aircraft, are rich in down range profiles. Although a ship's motion is relative slow, the huge size makes a ship's Doppler profile easily imaged by an inverse synthetic aperture radar. Radiations, which are reflected from ships, are highly affected by sea states. The sea state uncertainty makes ship's transient traits complex and dynamic. As anyone with ordinary skill in art will readily appreciate, smart RF decoys of the present invention will be able to mimic all these traits.

Depending on operation requirements, crafts of smart RF decoys can take many forms. The crafts can be towed recoverable, manual and rocket launched expendables, unmanned aerial and surface vehicles. They all can be fiber tethered or direct laser linked. In a tethered case, optical fiber is spooled on both ends. The host platform and craft each carry a respective end. The optical fiber is continuously paying out from spools during a deployment so that no stress is exerted on the fiber. The spooling and paying out limit the expected life time of a tethered decoy. The selection of decoy crafts should be done with care. The mobility of a host platform, the cost of decoys, the life time of effectiveness are the important factors in determining a selection.

As anyone with ordinary skill in art will readily appreciate, the system architecture of a smart RF decoy is flexible and generic. Many onboard and offboard counter measure techniques can be incorporated. Following are few examples. A proper control of transmission and sleep intervals leads to range gate pull off and pulse staggering methods. A coherent measurement of the Doppler shift difference between the smart RF decoy craft and its host leads to threat assessment. A coherent play among host and decoy transmissions leads to a cooperate blinking as well as an angle pull off countermeasures. A hybrid countermeasure can be developed so that the craft of a smart RF decoy is able to move onto the incoming path of and to intercept the threat. Many tethered decoys can be deployed simultaneously to mimic a squadron of aircraft or a battle group of ships.

The processing center of a smart RF decoy is onboard a ship. A smart RF decoy should be much smarter then any incoming threat. Any trick plays by incoming threats can be properly deciphered by the processing center. Doppler shift difference measurements will track movements and detect responses of threats. The processing center can come up with real time countermeasures to ensure the success of defeating threats. In accordance with the present invention, smart decoys are well suited for point defense of a ship.

Figure 9:
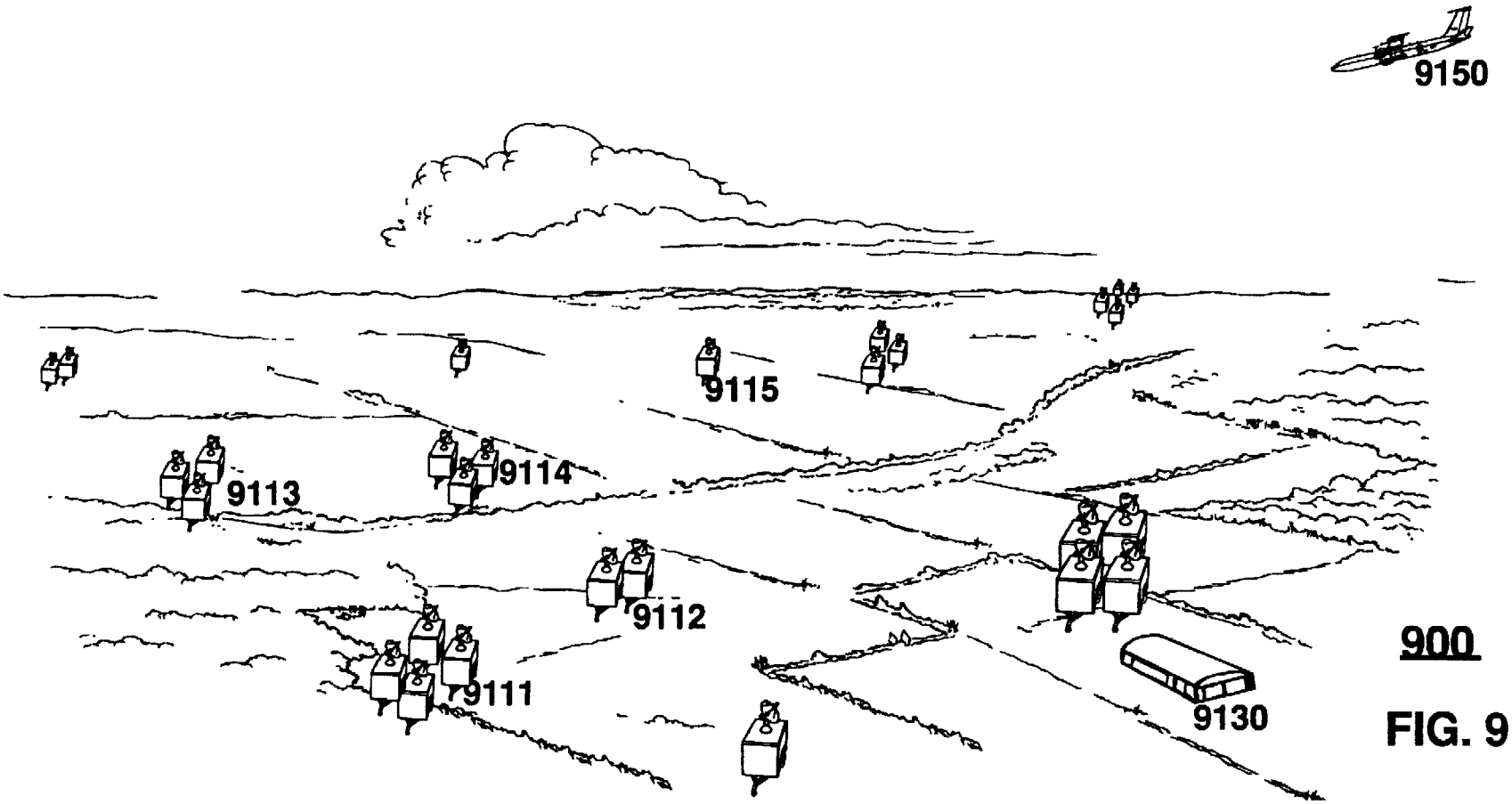
FIG. 9 shows a block diagram of an optical RF stereo systems fabricated in accordance with the present invention for RF environment deceptions of battles in action.
Figure 9A:
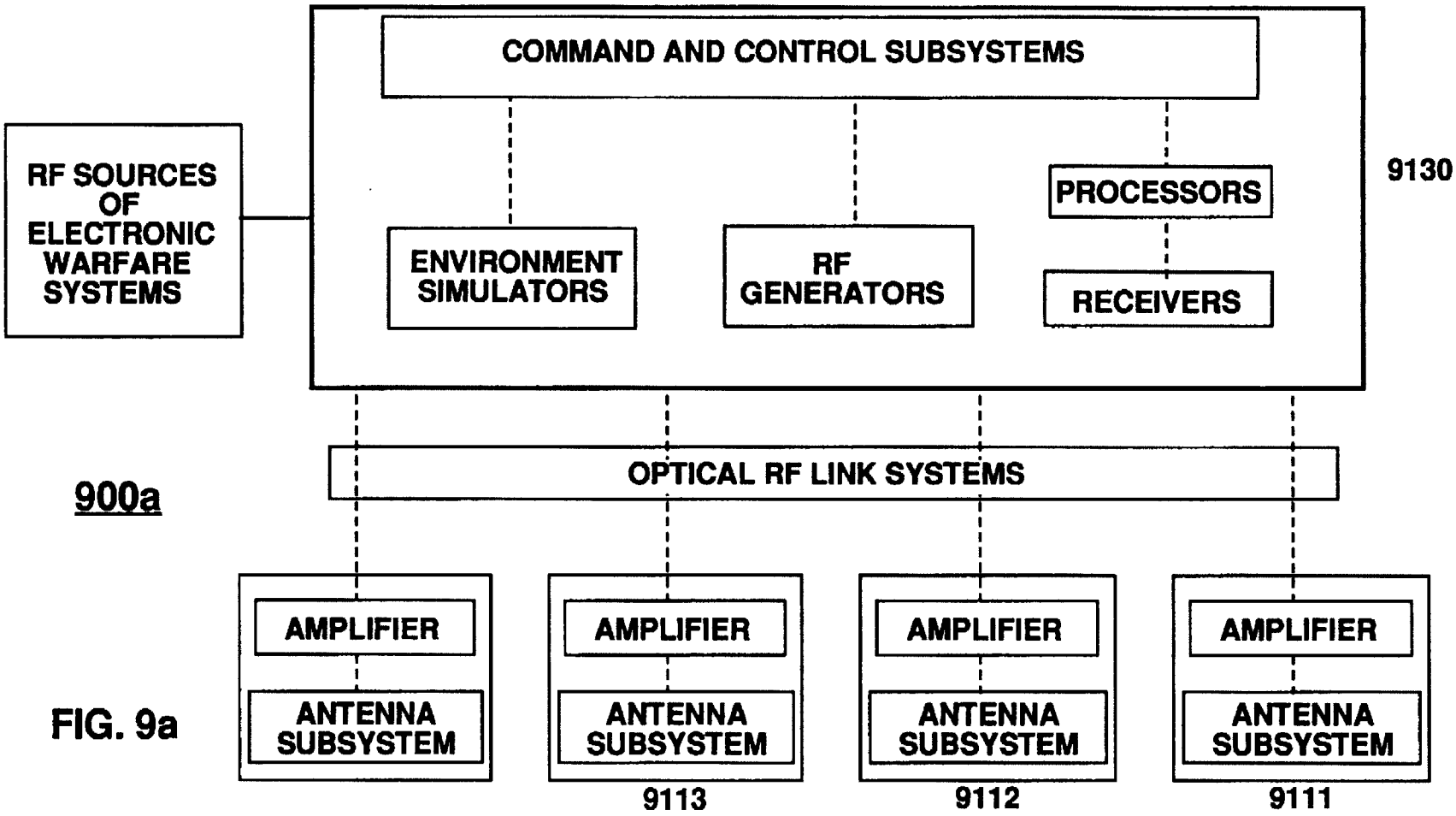
FIG. 9a show a schematic diagram of the optical RF stereo systems in FIG. 9 fabricated in accordance with the present invention.

FIG. 9 shows a block diagram of an optical RF stereo systems fabricated in accordance with the present invention for RF environment deceptions of battles in action. The purpose of the application is to mimic an RF environment, which is the replica of a battle in action, for live testings of various warfare measures and tactics, and for deception in war operations. Multiple remote vehicles (RV 9110, RV 9111, RV 9112, RV 9113, and . . . ) are deployed at different locations. The RVs are individually linked to and controlled by the processing center 9130. The processing center 9130 is housed inside a ground based platform. FIG. 9a show a schematic diagram of the optical RF stereo systems of FIG. 9 fabricated in accordance with the present invention. As shown in FIG. 9a, each RV has its own dedicated optical RF link system in linking with the processing center 9130.

In accordance with the present invention, RF generators, processors and receivers at the processing center 9130 are for electronic intelligence gathering, for setting up RF countermeasure deceptions, and for assessing countermeasure effectiveness. In further embodiments of the present invention, RVs are in various receiving, transmitting, and receiving transmitting modes. RF radiations received at each RV are transmitted through its optical RF link systems to the processing center 9130 for processing. RF signals generated by RF generators at the processing center 9130 are sent to RVs through their optical RF link systems for transmissions by their antennas. Furthermore, the processing center 9130 sends command and control signals through optical RF link systems to control antenna subsystems at RVs.

Proper RF sources are need for RF environment deceptions. When we play a record of Tchaikovsky's 1812 Overture, we are acoustically deceived as if a battle in action. A record is an acoustical source in creating the acoustical deception of a battle as intended by Tchaikovsky. Similarly, an RF source is needed to create an RF environment deception of a battle. If RF signals can be recorded, then a stereo play back of recorded RF signals from a live battle will replicate a battle. The problem is that RF signals can not be recorded. An alternative has to be found. Beside recording, musics can be synthesized. An electronic organ can mimic a musical environment with hundreds of musical instruments. The synthesization of RF environments is a well developed science and can be chosen as an alternative source.

Warfare environment simulators synthesize various kinds of RF environments. Some of these simulators are off-the-shelf. Advanced tactical electronic warfare environment simulators are capable of mimicking realistic tactical RF situations, of creating variety RF characteristics of electronic warfare support and countermeasure systems, and of replicating real-time warfare platforms. Furthermore, these simulators are efficient in providing complete control of created scenario, and in rapidly alternating RF environment characteristics. The versatility of these systems allows the generation of thousands signals within any RF scenario including dynamical effects of observer and emittier platforms. A battle has its spatial dimension, and composes many fighting units which widely spread in space. Tests with tactical electronic warfare environment simulators are often done under a single roof and limited to a single warfare platform, which is kept captive and is never at its owen deployment state. Despite the functional sophistication, these simulators lack of capabilities in simulating spatial characteristics of battle environments.

Mock up ranges with real electronic support and countermeasure system hardwares are test ranges to mimic environments of live battle fields, such that electronic warfare systems can be tested at their deployed states. Mock up ranges are task specific. Although these ranges provide spatial characteristics, but they lack of functional diversity. Each mock up range only serves a specific purpose. With proliferating of diversified and sophisticated warfare systems, constantly changing of threats, and never ending technology evolution, mock up ranges with their limited functionality can not fulfill and catch up with the demanding needs. In the light of the above, there is a need in the art for more advanced systems which is not only generic, but is also functionally and spatially diversified to mimic battle environments for tests of various tactics and of electronic warfare systems at their own deployed states. Embodiments of the present invention fulfill such a need.

In accordance with the present invention, remote vehicles 910, 911, 911, 913, . . . are distributed at a field and some of them are grouped together to form a fighting unit or a fighting platform. The processing center 9130 sends command and control signals through optical RF link systems to control the movements of antenna subsystems at RVs in satisfying the objectives of the test. In further embodiments of the present invention, environment simulators, which are well known to those of ordinary skill in art, are added to the processing center 9130, and are under the control of command and control subsystem. As those of ordinary skill in the art should readily appreciate, the numbers of RVs and their groups, the size of the field, and the architecture of distribution, and the number of environment simulators depend on the scope and objectivity of deception and simulation.

RF signals generated by environment simulators are sent through respective optical RF linked systems to RVs. Received RF signals are amplified and are transmitted through antenna subsystem at RVs to mimic real-time RF characteristics of electronic warfare support and countermeasure systems, as well as warfare platforms. Widely distributed RVs create spatial diversities to the deceptive systems and platforms. Proper selection of functional RF characteristics as generated by environment simulators and of RV configurations will lead to variety RF signatures in mimicking various kinds of battles. The sophistication of environment simulators make the deceptive systems and platforms generic.

In accordance with the present invention, active and passive RF radiations from warfare system 9150 under the test are received by antenna subsystems at RVs. The received RF radiations at RVs are sent through respective optical RF link system to the processing center 9130 for processing. The positions and velocities or warfare system 9150 can be accurately determined through comparative correlation and Doppler shift difference measurements in processing. The processing center 9150 can then assess actions of warfare systems 9150 at simulated RF environments.

A battle is an organized efforts and loaded with deceptions. A well planed battle should not only use simple deceptive means, but should also use sophisticated environment deceptions. In further embodiments of the present invention, the optical RF stereo system of FIG. 9 is deployed in battle engagements. A deployment of the present invention creates multiple magnitude complexity in RF environment to confuse hostile threats. The complexity will lead to an easy defeat of threats as well as precipitate electromagnetic interference degradation of friendly electronic support and countermeasure system. The degradation created by electromagnetic interference is resulted from lacking of integration among electronic support and countermeasure systems during an encounter. A best method to suppress the electromagnetic interference is not to create them. It is essential to integrate all deployed electronic systems and to put them under a single control, as if a conductor controls his symphony orchestra. In still further embodiments of the present invention, the optical RF stereo systems of FIG. 9 is integrated with electronic warfare systems as in FIG. 9a. Electronic warfare systems are linked with the processing center 9130 through communication links or optical RF links depending on the level of integrations. The command and control subsystems at the processing center 9130 controls the generation of all RF signals including RF sources of electronic warfare systems. The RF level control leads to a total system integration, which is similar to that of a conductor in controlling every instrument in the orchestra. A single advanced tactical electronic warfare environment simulator is capable in simultaneously emanating as many as 1000 emitter platforms without any electromagnetic interference problems. The sophistication of advanced electronic warfare simulators comes from a RF level integration. As those of ordinary skill in the art will readily appreciate, RF level integration of electronic systems is better than that of frequency spectrum management, and time management in suppressing electromagnetic interferences. In accordance with the present invention, electronic support and countermeasure systems should have a prevision to interface with optical RF stereo systems. A development of functional specific and interface lacking electronic warfare systems is discouraged.

ADVANTAGES AND OBJECTIVES

Embodiments of the present invention are advantageous because wide spatial separation between antennas at remote vehicles increases the baseline length in measurements which in turn enhance the ability in locating hostile or friendly RF emitters. In addition, the use of optical RF link systems makes optical RF stereo systems possible to coherently transmit and receive the RF signals from widely separated antennas and, thereby, to provide capabilities which are infeasible for mono or incoherent RF systems. In further addition, embodiments of the present invention enable optical RF stereo systems to replicate RF environment scenarios of a battle for testing of electronic warfare systems and for battle deceptions.

Embodiments of the present invention provide better determination of RF emitter's position, velocity, and states than that of the prior art. Embodiments of the present invention provide triangulation in distance difference determination, and Doppler shift difference in velocity determination. In addition, embodiments of the present invention provide means to locate and identify unfriendly emitters hidden in dense and hostile environments. In further addition, many well known correlation methods in scattering theories, with the help of optical RF delay loops, can be deployed to process RF signals from different remote vehicles for investigating the emitter states.

Embodiments of the present invention furnish better means in countering intelligent hostile seekers than means are furnished by the prior art.

Embodiments of the present invention are capable in mimicking real RF signatures of war platforms, in forcing RF seekers into searching modes, in pulling off threats imposed by hostile RF seekers, and in assessing the effectiveness of countermeasures at real time. In addition, embodiments of the present invention are capable in generating false RF imaging to countering synthetic imaging radars and to hide sensitive areas. In further addition, embodiments of the present invention have flexible and generic architectures which allow the incorporation of new and old techniques. In still further addition, embodiments of the present invention are robust in rapidly updating countermeasures to defeat threats.

Embodiments of the present invention provide better means in navigational safety than are made by conventional incoherent methods. Embodiments of the present invention provide means to access aircraft landing safety without the help from electronics aboard the aircraft, to observe aircraft turning speed, to mark flight routes, to guard aircraft onto the runway, to integrate and consolidate navigational systems. In addition, embodiments of the present invention can be integrated with optical bistatic network to form comprehensive systems in navigation.

Embodiments of the present invention provide means to intergrate electronic support and countermeasure systems, warfare environment simulators with optical RF stereo systems for reducing system degradations from electromagnetic interference. In addition, embodiments of the present invention provide an integrated mean to organize and to stage a battle engagement. In further addition, embodiments of the present invention provide means to defeat threats in point defense.

SUMMARY, RAMIFICATIONS, AND SCOPE

Those skilled in the art recognize that further embodiments of the present invention may be made without departing from its teachings. For example, the optical RF stereo can have many designs as well as different variations. Thus the scope of the invention should be determined by appended claims and their legal equivalent, rather than by the examples given.

What is claimed is:

1. An optical RF stereo systems comprising:

two [widely separated] antenna subsystems;

a processing center; and

[two] *at least one* optical RF link [systems] *system* linking *one of* the antenna subsystems to the processing center; wherein the optical RF stereo systems comprises means for forming a triangle among an object and two antenna subsystems; wherein the antenna subsystems comprise means for transmitting [concurrent] RF signals to or receiving from the object, *and comprise further means for performing same antenna functions at the same time*; wherein the optical RF link [systems comprise] *system comprises*: (a) means for receiving RF signals from one end; (b) means for up-converting the RF signals to an optical signal; (c) means for transiting the optical signal from one end to [a second] *other* end; (d) means for down-converting the optical signal [at the second end to] *back to* an RF signal; and (e) means for transiting the RF signals between the antenna subsystems and the processing center.

2. The optical RF stereo systems of claim 1 wherein said processing center comprises means for generating command and control signals; wherein the optical RF link [systems] *system* further [comprise] *comprises* means for receiving the command and control signals from the processing center and for sending them to the antenna subsystems; and wherein the antenna subsystems further comprise means responsive to the command and control signals for controlling operation of the means for transmitting or receiving the RF signals.

3. [The optical RF stereo systems of claim 1 wherein said processing center further comprises means for correlating RF signals from the antenna subsystems; wherein the correlating means comprise means for determining the time arrival differences or the Doppler shift differences of the RF signals from antenna subsystems] *The optical RF stereo system of claim 2 wherein said processing center comprises means for measuring Doppler shift differences or time arrival differences of the RF signals from one antenna subsystem with respect to the other antenna subsystem.*

4. The optical RF stereo systems of claim 1 *is able to operate in a transmitting mode;* wherein said processing center comprises means for generating RF signals; wherein the processing center further comprises means for splitting said RF signals into two parts; wherein the optical RF [link] *stereo* systems [comprise] *comprises* means for sending first part of RF signals to an antenna subsystem and second part of RF signals to another antenna subsystem *through at least one optical RF link system*; wherein the antenna subsystems further comprise means for amplifying the RF signals from the optical RF link [systems] *system*, wherein the transmitting means of the antenna subsystems comprise further means to transmit the RF signals from the amplified means.

5. The optical RF stereo systems of claim 1 [wherein said antenna subsystems comprises both means for receiving and transmitting RF signals] *is able to operate in a receiving-transmitting mode*; wherein the optical RF stereo systems comprises further means for setting up a coherent path from the first antenna subsystem [through an amplifier, an optical RF link system,] *via* the processing center, [a second optical RF link system, and a second amplifier] to the second antenna subsystem *through at least one optical RF link system*; wherein the optical RF stereo systems comprises means for routing RF signals from the object received by the first antenna subsystem [in a same direction] through the coherent path to the second antenna subsystem for transmitting back to said object; wherein the optical RF stereo systems comprises further means for routing [concurrent] RF signals from said object received by the second antenna subsystem in [an opposite direction] *reverse* through the coherent path to the first antenna subsystem for transmitting back to said object.

6. The optical RF stereo systems of claim 1 wherein said processing center further comprises optical fiber RF delay loops; wherein the optical fiber RF delay loops comprise means for reducing the path length difference of [of] RF signals through paths linking the object by way of different antenna subsystems to the processing center.

7. The optical RF stereo systems of claim 1 further comprising additional irregularly distributed antenna subsystems and additional optical RF link systems; wherein the additional optical RF link systems comprise means for linking the additional antenna subsystems to the processing center.

8. The optical RF stereo systems of claim 7 wherein said processing center comprises further means for simulating RF environment signatures[; wherein the optical RF link systems comprise means for sending the RF environment signatures from the processing center to the antenna subsystems; wherein the antenna subsystems comprise means for transmitting the RF environment signatures to an object] *and for sending the RF environment signatures from the processing center to the antenna subsystems through at least one optical RF link system; wherein the antenna subsystems comprise means for transmitting the RF environment signatures to an object.*

9. The optical RF stereo systems of claim 7 wherein said antenna subsystems comprise means for receiving RF signatures agitated by RF signals from the object wherein the optical RF link systems comprise means for [concurrently] sending the received RF signatures *from the antenna subsystems* to the processing center; wherein the processing center further comprises processing means for harmonically mixing, delaying and amplifying [concurrent] RF signatures; wherein the optical RF link systems comprises means for sending the processed RF signatures from the processing center to one or more antenna subsystems; wherein the antenna subsystems comprise means for amplifying the RF signatures and for transmitting back to said object.

10. The optical RF stereo systems of claim 7 wherein said one or more antenna subsystems are fixed to movable means; wherein the optical RF link systems comprise means for linking antenna subsystems on the movable means to the processing center.

11. The optical RF stereo systems of claim 10 wherein said movable means comprise one or more means for receiving or transmitting audio, video, infrared [and] *or* optical signals; wherein the optical RF link systems further comprise means for transferring [and applying] the signals to *or receiving from* the processing center; wherein the processing center further comprises means for processing audio, video, infrared, [and] *or* optical signals.

12. The optical RF stereo systems of claim 10 wherein said one or more movable means comprise means for neutralizing *or deceiving* objects of interest; wherein the processing center further comprises means for generating commands to control the means in neutralizing *or deceiving* objects of interest.

13. A method for operating optical RF stereo systems comprising the steps of:

(a) forming a triangle among an object and two antenna subsystems;

(b) transmitting [concurrent] RF signals at the two antenna [systems] *subsystems* to the object or receiving from the object, *with two antenna subsystems performing same antenna functions at the same time*;

(c) linking each antenna subsystem individually to a processing center through *at least one* optical RF link [systems] *system*;

(d) up-converting RF signals to optical signals;

(e) transiting optical signals from one [ends] *end* of *the* optical RF link [systems] *system* to other [ends] *end, and down converting optical signals back to RF signals*;

(f) transiting [concurrent] RF signals between the antenna subsystems and the processing center over *at least one* optical RF link [systems] *system.*

14. The method of claim 13 further comprising the steps of:

[(g) generating command and control signals at the processing center;

(h) sending the command and control signals from the processing center to the antenna subsystems;

(i) operating the antenna subsystems in responding to the command and control signals]

*(h) causing at least one of the antenna subsystems to perform transmitting and receiving functions;*

*(i) causing at least one of the antenna subsystems to perform transmitting or receiving functions.*

15. The method of claim 13 further comprising the steps of:

(g) correlating RF signals from antenna subsystems at the processing center;

(h) determining the time arrival differences of the RF signals;

(i) *or* determining the Doppler shift differences of the RF signals.

16. The method of claim 13 further comprising the steps of:

(g) generating RF signals and simulating RF environment signatures at the processing center;

(h) sending the RF signals and RF environment signatures to the antenna subsystems over *at least one* optical RF link [systems] *system*;

(i) amplifying the signals and signatures;

(j) transmitting the amplified signals and signatures from the antenna subsystems to the object.

17. The method of claim 13 further comprising the steps of:

(g) setting up a coherent path from the first antenna subsystem [through an amplifier, an optical RF link system], *via* the processing center, [a second optical RF link system, and a second amplifier] to the second antenna subsystem *through at least one optical RF link system*;

(h) routing RF signals from the object received by the first antenna subsystem [in a same direction] through the coherent path to the second antenna subsystem;

(i) transmitting RF signals from the second antenna subsystem back to said object;

(j) routing [concurrent] RF signals from said object received by the second antenna subsystem in [an opposite direction] *reverse* through the coherent path to the first antenna subsystem;

(k) transmitting the [concurrent] RF signals from the first antenna subsystem back to said object.

18. The method of claim 13 further comprising the steps of:

(g) receiving RF signatures agitated by RF signals from the object;

(h) sending the received RF signatures [concurrently] to the processing center *through at least one optical RF link system*;

(i) harmonically mixing, delaying and amplifying [concurrent] RF signatures at the processing center;

(j) sending the processed RF signatures from the processing center to one or more antenna subsystems;

(k) amplifying the RF signatures;

(l) transmitting RF signatures back to said object.

19. A direct laser bistatic radar system comprising:

a transmitting site;

a receiving site;

a direct laser RF link system linking the transmitting site and receiving site; wherein the transmitting site comprises means for transmitting RF signals to an object; wherein the receiving site comprises means for receiving RF signals reflected from said object; and wherein the direct laser RF link systems comprises: (a) means for receiving a portion of the reflected RF signals from the receiving radar site; (b) means for up-converting the portion of reflected RF signals to an optical signal; (c) means for sending the optical signal from one end to a second end; (d) means for down-converting the optical signal at the second end to a RF signal; and (e) means for sending the received RF signals to the transmitting radar site; wherein the transmitting site comprises means for processing the received RF signals.

20. An RF network comprising:

[a radar network;

an optical RF stereo systems;]

*one or more radar systems;*

*one or more antenna subsystems;*

*one or more optical RF link systems;* a master [management] *processing* center;

[optical fiber RF delay loops;

wherein the master management center comprises means for integrating the management center of the radar network and the processing center of the optical RF stereo systems; wherein the optical RF delay loops comprise means for reducing path length differences of RF signals through paths linking an object by way of various antenna subsystems to the master management center]

*wherein the antenna subsystems comprise means for performing same antenna functions at the same time; wherein the optical RF link systems comprise means for linking the antenna subsystem with the master processing center, and for sending RF signals between the antenna subsystems and the master processing center; wherein the master processing center comprises means for receiving radar signals from the radar systems; wherein the master processing center comprises further means for processing the RF signals from the antenna subsystems with a reference to the radar signals from the radar systems, or means for correlating the RF signals from the antenna subsystems, or means for sending RF signals to the antenna subsystems for transmission.*

* * * * *